(12) United States Patent
Inagaki et al.

(10) Patent No.: US 7,886,593 B2
(45) Date of Patent: Feb. 15, 2011

(54) FLOW METER AND FLOW CONTROLLING DEVICE

(75) Inventors: Hiroyuki Inagaki, Tokyo (JP); Shigeru Aoshima, Tokyo (JP); Takeshi Watanabe, Tokyo (JP)

(73) Assignee: Yamatake Corporation, Tokyo (JP)

( * ) Notice: Subject to any disclaimer, the term of this patent is extended or adjusted under 35 U.S.C. 154(b) by 90 days.

(21) Appl. No.: 12/502,291

(22) Filed: Jul. 14, 2009

(65) Prior Publication Data

US 2010/0064798 A1 Mar. 18, 2010

(30) Foreign Application Priority Data

Sep. 12, 2008 (JP) .............................. 2008-234122

(51) Int. Cl.
*G01F 5/00* (2006.01)

(52) U.S. Cl. ....................................... 73/203

(58) Field of Classification Search .............. 73/861.83, 73/202, 203

See application file for complete search history.

(56) References Cited

U.S. PATENT DOCUMENTS

| | | | |
|---|---|---|---|
| 4,280,360 A | 7/1981 | Kobayashi et al. | |
| 4,433,575 A * | 2/1984 | Rutherford | 73/202 |
| 6,199,434 B1 * | 3/2001 | Cornil et al. | 73/861.83 |
| 6,655,207 B1 * | 12/2003 | Speldrich et al. | 73/202.5 |
| 7,222,519 B2 * | 5/2007 | Ekanayake | 73/73 |
| 2004/0163461 A1 | 8/2004 | Ito et al. | |
| 2008/0283014 A1 | 11/2008 | Konzelmann et al. | |

FOREIGN PATENT DOCUMENTS

| | | |
|---|---|---|
| EP | 1146320 A1 | 10/2001 |
| JP | 2007-121036 A | 5/2007 |

* cited by examiner

*Primary Examiner*—Jewel Thompson
(74) *Attorney, Agent, or Firm*—McDermott Will & Emery LLP

(57) ABSTRACT

To provide a highly accurate flow meter. A Flow meter comprising an inflow opening into which a measurement fluid flows, an outflow opening from which a measurement fluid flows, and a flow path connecting the inflow opening and the outflow opening, wherein the flow path is bent at a first bend portion, wherein: a first porous plate is disposed in the first bend portion of the flow path at an angle relative to the direction in which the flow path extends before and after the first bend portion, and a flow sensor for detecting the flow speed or flow volume of a measurement fluid that flows in the flow path, disposed on the inner wall of the flow path on the outflow opening side of the first bend portion.

16 Claims, 27 Drawing Sheets

FLOW METER AND FLOW CONTROLLING DEVICE

INCORPORATION BY REFERENCE

The present invention claims priority under 35 U.S.C. §119 to Japanese Patent Application No. 2008-234122 filed Sep. 12, 2008. The content of the application is incorporated herein by reference in its entirety.

FIELD OF TECHNOLOGY

The present invention relates to a flow measuring technology, and in particular, relates to a flow meter and a flow controlling device.

BACKGROUND OF THE INVENTION

In industrial furnaces, boilers, air-conditioning heat source devices, and the like, there is the need to supply fluids inappropriate flow volumes. A variety of flow meters for measuring flow volumes accurately have been developed for this purpose. Accurate measurements of flow volumes require the stabilization of speed distributions in fluids flowing in a flow path. Because of this, there have been proposals for methods for stabilizing the fluid speed distributions through causing the fluid to collide with the inner wall of the flow path through causing the flow path to bend. (See, for example, Japanese Unexamined Patent Application Publication 2007-121036.) However, more accurate flow meters are desired.

The object of the present invention is to provide a flow meter, and a flow volume controlling device, capable of measuring flow volumes with high accuracies.

SUMMARY OF THE INVENTION

The distinguishing feature of the present invention can be summarized as being (I) a flow meter including an inflow opening into which a measurement fluid that flows, an outflow opening from which a measurement fluid flows, and a flow path connecting the inflow opening and the outflow opening, where the flow path is bent at a first bend portion, comprising: (II) a first porous plate disposed in the first bend portion of the flow path at an angle relative to the direction in which the flow path extends before and after the first bend portion; and (III) a flow sensor for detecting the flow speed or flow volume of the measurement fluid flowing in the flow path, disposed on the inner wall of the flow path on the outflow opening side of the first bend portion. While conventionally it has been thought that biased flow in the measurement fluid has been eliminated by the bend portion of the flow path, the flow meter as set forth in the present invention is able to further increase the flow rectifying effective through the first porous plate.

Another distinguishing feature of the present invention is summarized as a (I) flow volume controlling device including an inflow opening into which a measurement fluid flows, an outflow opening from which the measurement fluid flows, and a flow path connecting the inflow opening and the outflow opening, wherein the flow path is bent at a first bend portion, comprising: (II) a first porous plate disposed at the first bend portion of the flow path at an angle relative to the direction in which the flow path extends before and after the first bend portion; (III) a flow sensor disposed on the inner wall of the flow path at the outflow opening side of the first bend portion; (IV) a calculating module for calculating the flow volume of the measurement fluid that flows in the flow path from the flow speed of the measurement fluid that flows in the flow path, detected by the flow sensor; (V) a controlling valve but provided in the flow path; and (VI) a controller for controlling the flow volume through controlling the controlling valve based on the calculated flow volume. Because of the first porous plate, the flow sensor detects the flow speed or flow volume accurately, so that the flow volume is controlled appropriately by the controller and the controlling valve.

The present invention enables the provision of a flow meter and a flow volume controlling device capable of measuring the flow volume with high accuracy through rectifying the flow of the measurement fluid. Additionally, the present invention is able to remove contaminating substances from the measurement fluid to reduce the collisions and adhesion of the contaminating substances to the flow sensor, to thereby reduce the occurrence of problems caused by the contaminating substances.

DETAILED DESCRIPTION OF THE INVENTION

Figure 1:
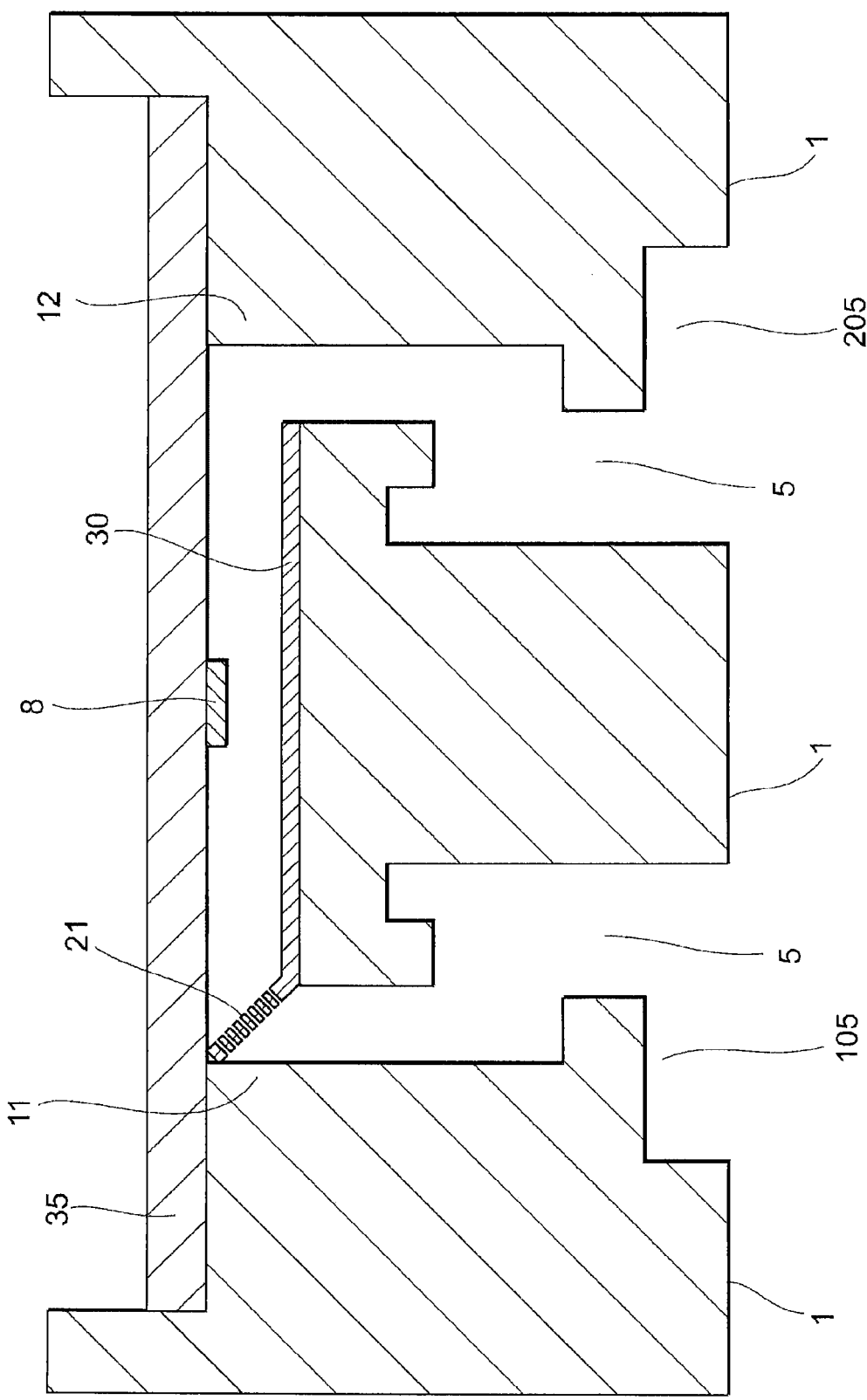
FIG. 1 is a cross-sectional diagram of a flow meter according to an embodiment according to the present invention.

A form of embodiment according to the present invention will be described below. In the drawings provided below, identical or similar portions are expressed with identical or similar codes. Note that the drawings are merely representative. Consequently, specific dimensions, and the like, should be determined in light of the description below. Additionally, there will be, of course, portions wherein the relationships and proportions between dimensions will differ from drawing to drawing.

A flow meter according to an embodiment is provided with a flow path block 1, as illustrated in FIG. 1. The block 1 is provided with an inflow opening 105 into which a measurement fluid flows, an outflow opening 205 from which the measurement fluid flows, and a flow path 5 connecting the inflow opening 105 and the outflow opening 205. The flow path 5 is bent at a first bend portion 11 and a second bend portion 12. Additionally, the flow path 5 between the first and second bend portions 11 and 12 is provided linearly. Furthermore, the flow meter according to the embodiment is provided also with a first porous plate 21 that is disposed at the first bend portion 11 of the flow path 5 at an angle relative to the direction in which the flow path 5 extends before and after the first bend portion 11, and a flow sensor 8 for detecting the flow speed or the flow volume of the measurement fluid that flows in the flow path 5, disposed on the inner wall of the flow path 5 between the first and second bend portions 11 and 12.

Figure 2:
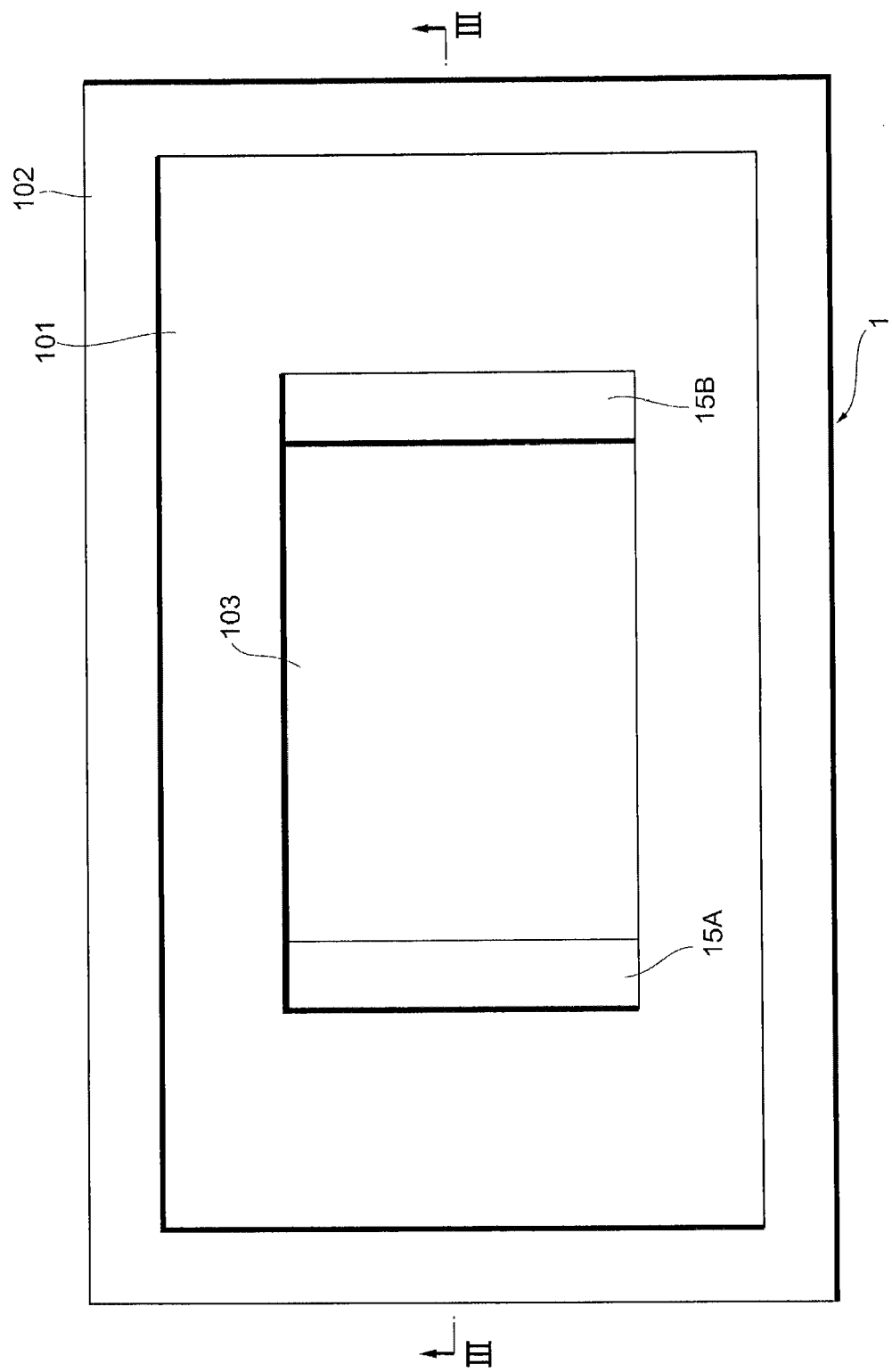
FIG. 2 is a top view of a flow path block according to an embodiment according to the present invention.
Figure 3:
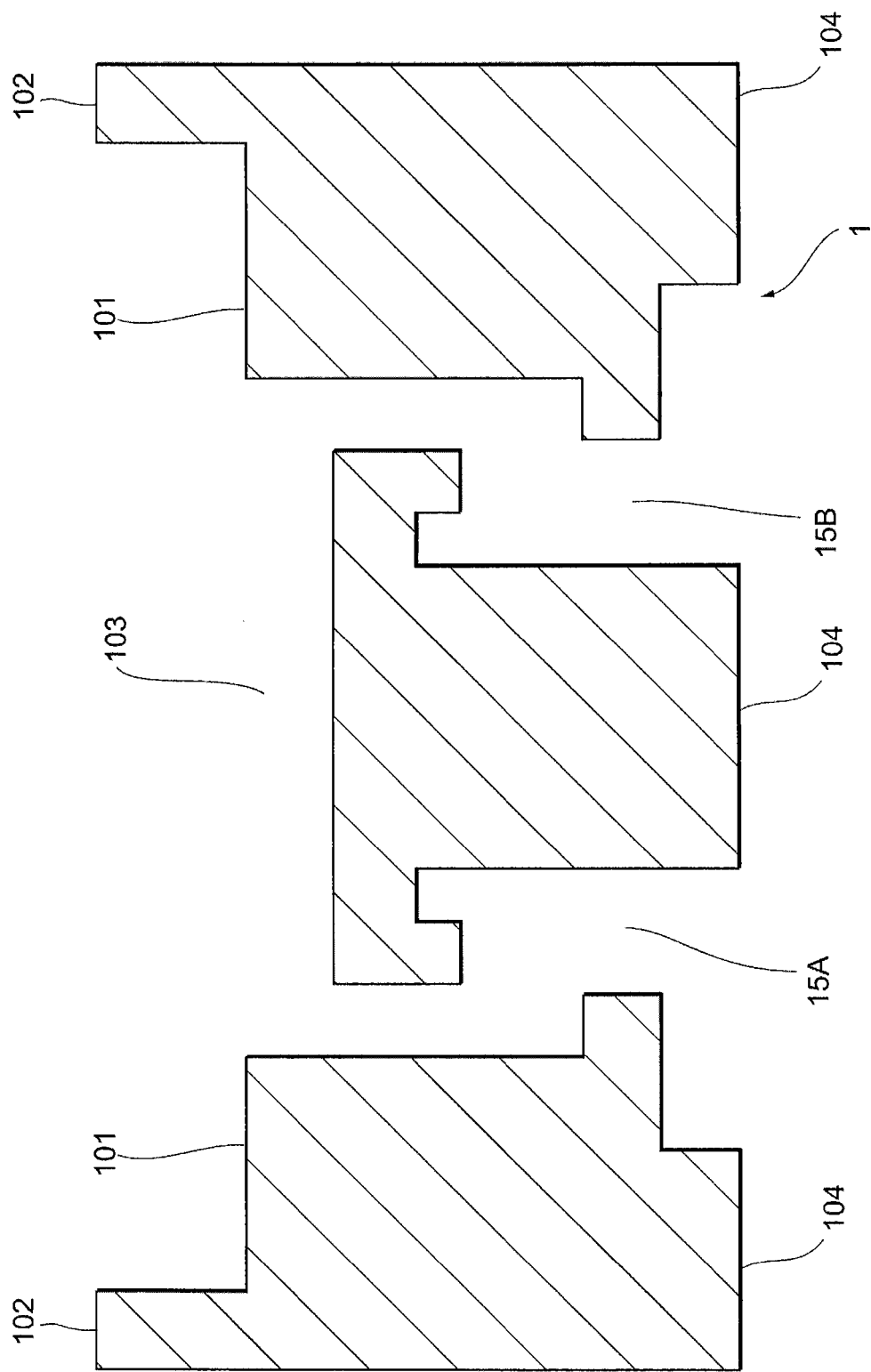
FIG. 3 is a cross-sectional diagram viewed from the direction of III-III of FIG. 2 of the flow path block according to an embodiment according to the present invention.

As illustrated in the plan view diagram of FIG. 2 and the cross-sectional diagram of FIG. 3, which is a cross-sectional diagram when viewed from the direction of III-III, an indented portion 103 is provided in a top surface 101 of the flow path block 1. Furthermore, a through hole 15A and a through hole 15B penetrate from the bottom surface at both ends of the lengthwise direction of the indented portion 103 towards the bottom surface 104 of the flow path block 1. The cross-sectional shapes of the through hole 15A and of the through hole 15B are, for example, rectangular. However, there is no limitation to this shape, and the shape may be a combination of straight lines and curved lines. A frame 102 may be provided on the outer periphery of the top surface 101 of the flow path block 1 so as to encompass the indented portion 103. Metal, plastic, or the like may be used as the material for the flow path block 1.

Figure 4:
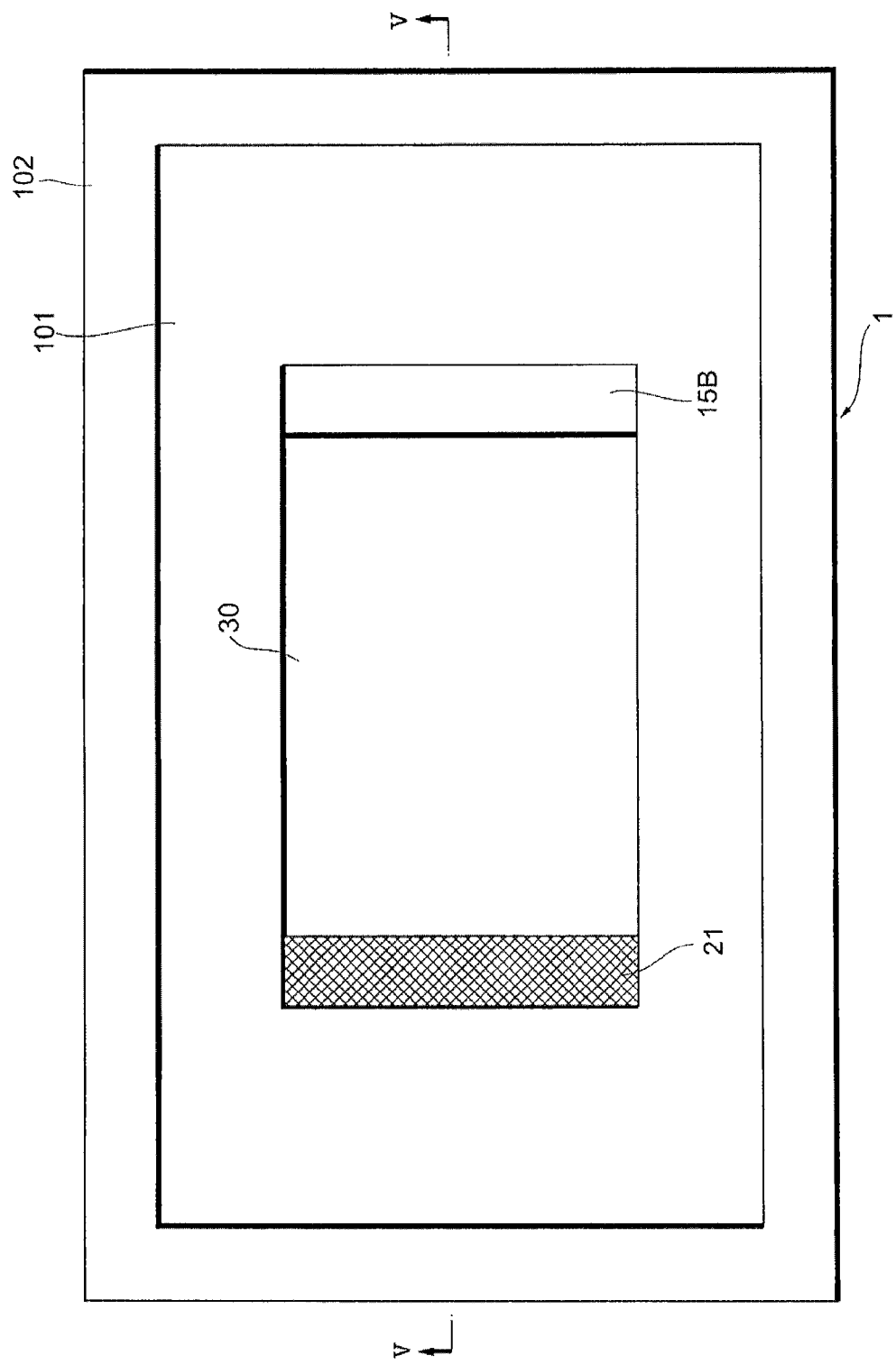
FIG. 4 is a top view diagram of the flow path block in which a porous plate and a supporting plate are disposed according to an embodiment according to the present invention.
Figure 5:
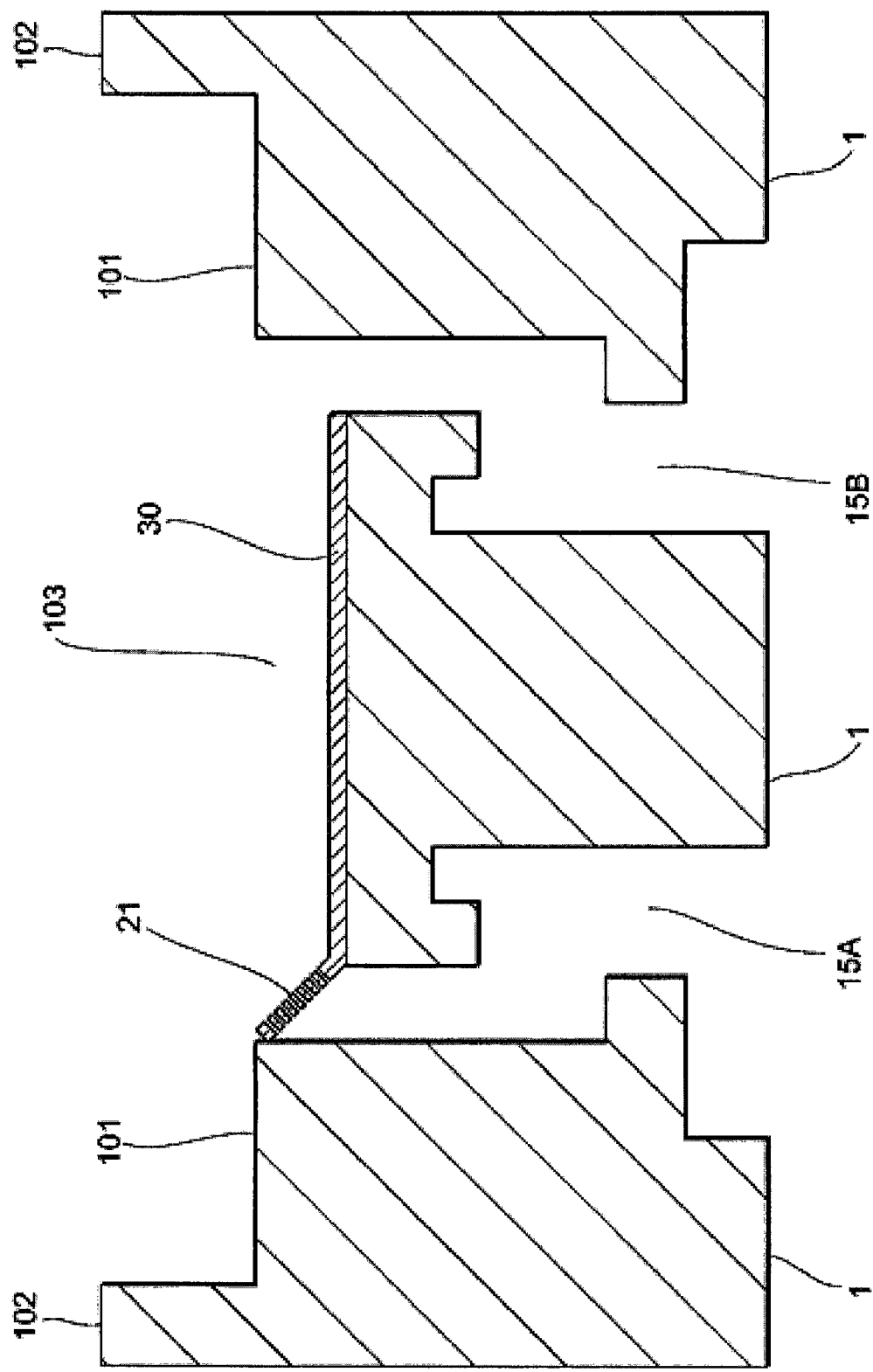
FIG. 5 is a cross-sectional diagram viewed from the direction of V-V of FIG. 4 of the flow path block wherein the porous plate and the supporting plate are disposed according to an embodiment according to the present invention.

As illustrated in FIG. 4 and also in the cross-sectional diagram that is a view from the direction of V-V which is FIG. 5, a supporting plate 30 is disposed, so as to not block the through holes 15A and 15B, on the flat bottom surface of the indented portion 103 of the flow path block 1. The width of the indented portion 103 and the width of the supporting plate 30 are essentially identical, where the side surfaces of the supporting plate 30 are in contact with the inner walls of the indented portion 103. Because of this, the supporting plate 30 is secured to the bottom surface of the indented portion 103 by the frictional force that acts between the inner walls of the indented portion 103 and the side surfaces of the supporting plate 30.

The first porous plate 21 is connected at an angle to the supporting plate 30. For example, a rectangular first porous plate 21 is connected on one side to the supporting plate 30, and, on all other three sides, is in contact with the inner walls of the indented portion 103. Because of this, the first porous plate 21 is secured so as to cover, at an angle, the opening of the through hole 15A that is provided at the bottom surface of the indented portion 103, through the force of friction that acts between the inner walls of the indented portion 103 and the side walls of the first porous plate 21.

A large number of holes are provided in the first porous plate 21. The diameters of each of the large number of holes provided in the first porous plate 21 are, for example, 0.15 mm, where the hole-to-hole pitch may be, for example, 0.25 mm. The supporting plate 30 and the first porous plate 21 may be integrated into a single unit. The supporting plate 30 and the first porous plate 21 are made from, for example, a flexible material such as stainless steel (SUS). The supporting plate 30 and the first porous plate 21 may be obtained through, for example, providing a large number of holes in the end portion of a stainless steel (SUS) plate through etching and then bending the end portion. Note that when bending, the bending may be such that a portion of the large number of holes remains in the supporting plate 30.

A cover plate 35, illustrated in FIG. 1, is disposed so as to cover the indented portion 103 at the top surface 101 of the flow path block. The continuous flow path 5, illustrated in FIG. 1, is structured from the through hole 15A, illustrated in FIG. 5, the indented portion 103, illustrated in FIG. 5, covered by the cover plate 35, illustrated in FIG. 1, and the through hole 15B. The area above the through hole 15A that is provided in the indented portion 103, illustrated in FIG. 5, covered by the cover plate 35, forms the first bend portion 11 that is illustrated in FIG. 1, where the flow path bends at a right angle at the first bend portion 11. Additionally, the area above the through hole 15B that is provided in the indented portion 103 illustrated in FIG. 5, covered by the cover plate 35, forms the second bend portion 12 that is illustrated in FIG. 1, where the flow path 5 is again bent to a right angle at the second bend portion 12. In the below, the first bend portion 11 side of the flow path 5 will be described as being upstream of the flow path 5, and the second bend portion 12 side of the flow path 5 will be described as being downstream of the flow path 5.

A flow sensor 8 is disposed on the bottom surface of the cover plate 35, which functions as the inner wall of the flow path 5, between the first bend portion 11 and the second bend portion 12. An electrode, etc., for connecting to the flow sensor 8 and an electric circuit are provided on the front side of the cover plate 35. The flow sensor 8, as illustrated in the oblique view diagram in FIG. 6 and also in the cross-sectional diagram from the direction of VII-VII which is FIG. 7, includes a substrate 60 in which a cavity 66 is provided, an insulating layer 65 that is provided so as to cover the cavity 66 on the substrate 60, a heater 61 that is provided on the insulating layer 65, an upstream side temperature measuring resistance element 62 provided on the upstream side of the heater 61, a downstream side temperature measuring resistance element 63 provided on the downstream side of the heater 61, and an ambient temperature sensor 64 provided further on the upstream side from the upstream side temperature measuring resistance element 62.

Figure 6:
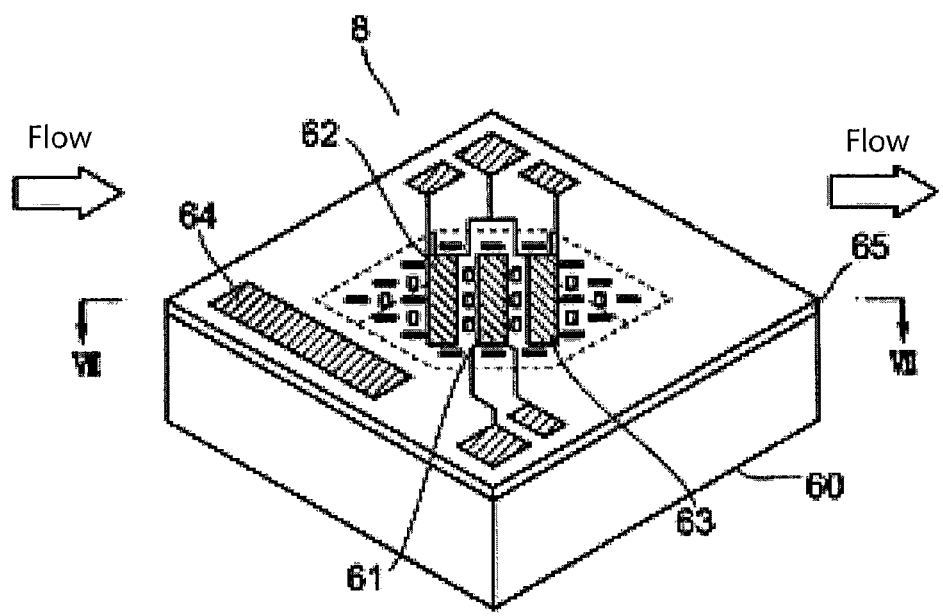
FIG. 6 is an oblique view of a flow sensor according to an embodiment according to the present invention.
Figure 7:
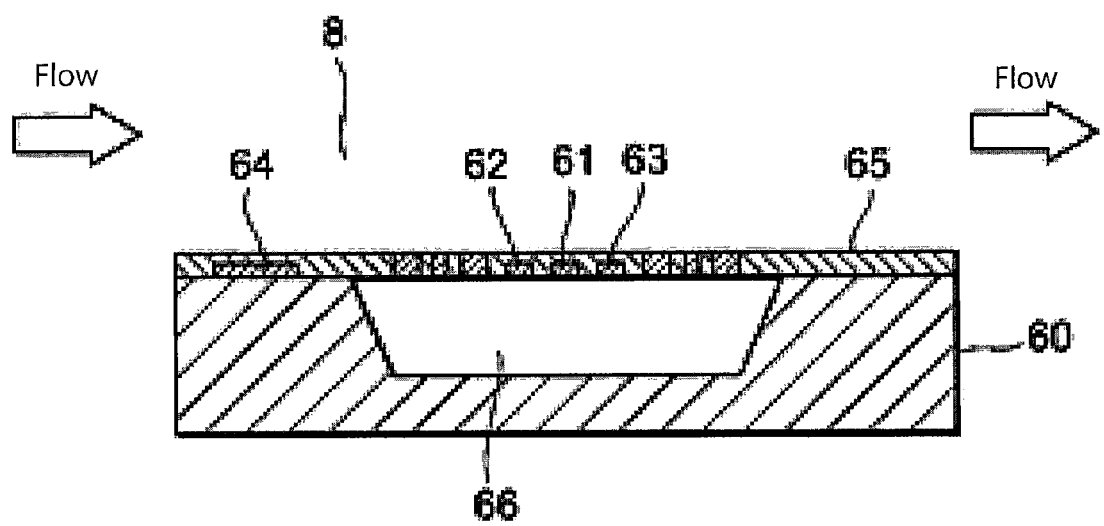
FIG. 7 is a cross-sectional diagram when viewed from the direction of VII-VII of FIG. 6 of the flow sensor according to an embodiment according to the present invention.

The portion of the insulating layer 65 that covers the cavity 66 forms a thermally insulating diaphragm. The ambient temperature sensor 64 measures the temperature of the measurement fluid that flows in the flow path 5, illustrated in FIG. 1. The heater 61 illustrated in FIG. 6 and FIG. 7 is disposed in the center of the insulating layer 65 that covers the cavity 66, and keeps the measurement fluid that flows in the flow path 5 to a specific temperature that is higher than the temperature measured by the ambient temperature sensor 64, such as 10° C. higher. The upstream temperature measuring resistance element 62 is used to detect the temperature on the upstream side of the heater 61, and the downstream temperature measuring resistance element 63 is used to detect the temperature on the downstream side of the heater 61.

Here, if the fluid within the flow path 5, illustrated in FIG. 1, is stationary, the heat that is applied by the heater 61, illustrated in FIG. 6 and FIG. 7, will diffuse symmetrically in the upstream direction and the downstream direction. Consequently, the temperatures of the upstream-side temperature measuring resistance element 62 and the downstream-side temperature measuring resistance element 63 will be equal, so the electrical resistances of the upstream-side temperature measuring resistance element 62 and the downstream-side temperature measuring resistance element 63 will be equal. In contrast, when the fluid in the flow path 5, illustrated in FIG. 1, is flowing from upstream to downstream, the heat that is added by the heater 61 will be carried to the downstream side. Consequently, the temperature at the downstream-side temperature measuring resistance element 63 will be higher than the temperature at the upstream-side temperature measuring resistance element 62. Because of this, there will be a difference between the electrical resistance of the upstream-side temperature measuring resistance element 62 and the electrical resistance of the downstream-side temperature measuring resistance element 63. This difference between the electrical resistance of the downstream-side temperature measuring resistance element 63 and the electrical resistance of the upstream-side temperature measuring resistance element 62 will have a correlation relationship with the speed and flow volume of the fluid in the flow path 5 that is illustrated in FIG. 1. Because of this, it is possible to calculate the flow speed and the flow volume of the fluid that is flowing in the flow path 5 from the electrical resistance of the downstream-side temperature measuring resistance element 63 and the electrical resistance of the upstream-side temperature measuring resistance element 62.

Silicon (Si) or the like may be used as the material for the substrate 60 illustrated in FIG. 6 and FIG. 7. Silicon oxide (SiO2) or the like may be used as the material for the insulating layer 65. The cavity 66 may be formed through anisotropic etching, or the like. Furthermore, platinum (Pt) may be used as the material for the heater 61, for the upstream-side temperature measuring resistance element 62, for the downstream-side temperature measuring resistance element 63, and for the ambient temperature sensor 64, and these may be formed through a lithographic method, or the like.

In the case of measuring the flow volume of the measurement fluid with the flow meter according to the embodiment, illustrated above, the measurement fluid flows into the flow path 5 from the inflow opening 105 illustrated in FIG. 1. The measurement fluid flows in the flow path 5, arrives at the first bend portion 11, and the direction of progress bends to a right angle. Here the measurement fluid passes through the large number of holes that are provided in the first porous plate 21. However, contaminating substances that are larger than the large number of holes provided in the first porous plate 21 do not pass through the first porous plate 21. Because of this, only the measurement fluid from which the contaminating substances have been removed will flow through the flow path 5 downstream of the first bend portion 11 to flow out from the outflow opening 205. Consequently, the detection of the flow speed of the measurement fluid by the flow sensor 8 that is disposed on the inner wall of the flow path 5 on the outflow opening 205 side of the first bend portion 11 is not impeded by the contaminating substances. Moreover, there will be no damage to the flow sensor 8 due to collisions by the contaminating substances.

Figure 8:
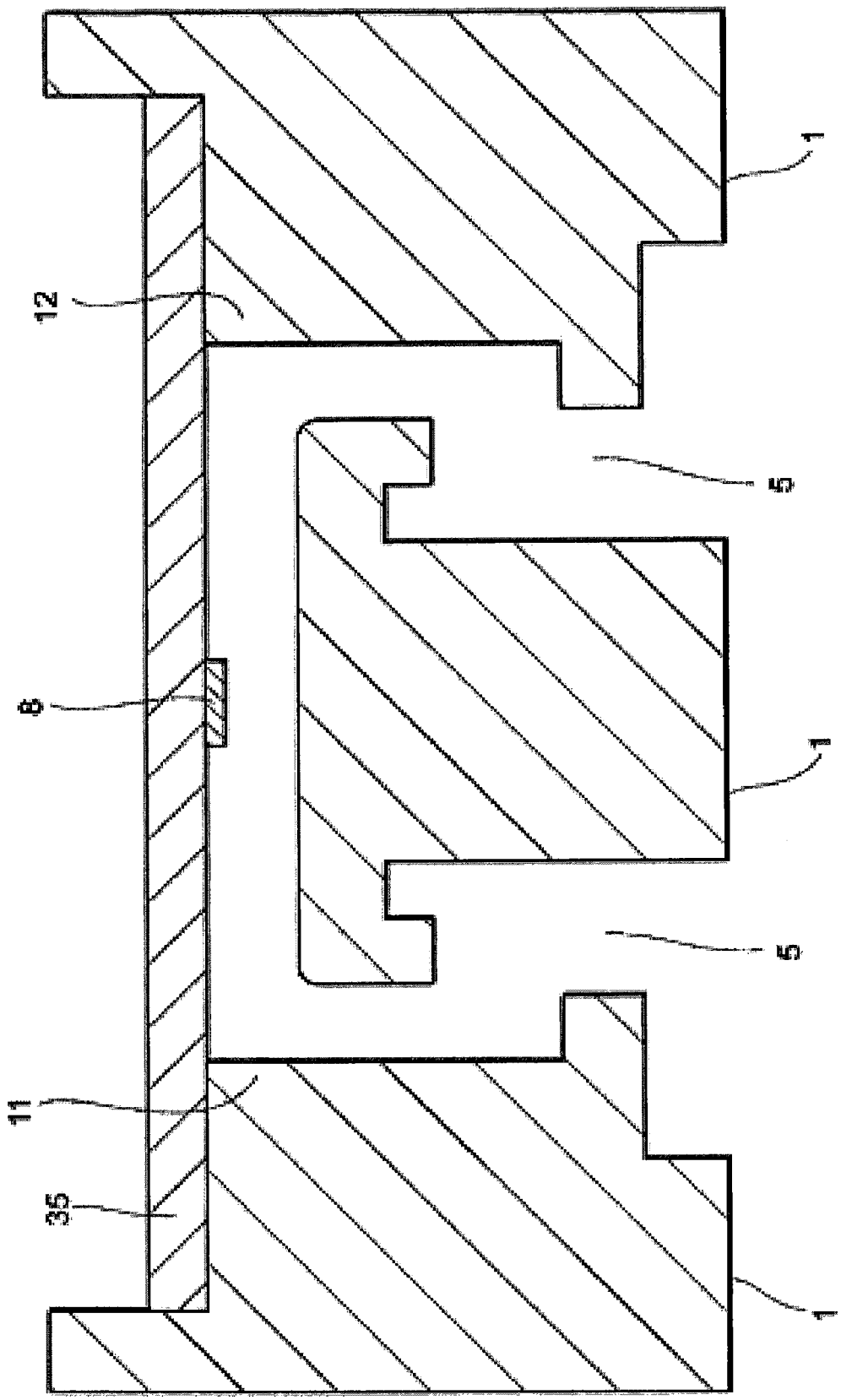
FIG. 8 is a cross-sectional diagram of a flow meter according to a comparative example of an embodiment according to the present invention.

Conventionally it had been thought that the provision of the bend portion in the flow path eliminated the biased flow of the measurement fluid, and that flow rectification would be performed through the viscosity of the measurement fluid that flows through a flow path having a flow path height that is reduced thereafter. Because of this, it was thought that there was no need to provide a porous plate for flow rectification in the first bend portion 11 in the flow path 5, as in the flow meter according to the comparative example illustrated in FIG. 8. However, the inventors discovered that even though there was a uniform flow rectifying effect in the bend portion, in some cases there would be a slight amount of turbulent flow in eddy currents, or the like, in the bend portion, where this turbulent flow interfered with accurate flow volume measurements. In contrast, in the flow meter according to the embodiment as illustrated in FIG. 1, a first porous plate 21 is provided in the first bend portion 11. Because of this, the turbulent flow that is produced in the first bend portion 11 undergoes further flow rectification through the first porous plate 21. This enables the speed of the measurement fluid to be detected with greater accuracy by the flow sensor 8.

Furthermore, conventionally the disposal of a porous plate in the bend portion of the flow path of a flow meter has been considered difficult. In contrast, the first porous plate 21 is disposed easily into the first bend portion 11 through disposing a supporting plate 30, connected at an angle to the first porous plate 21, as illustrated in FIG. 5, at the bottom surface of an indented portion 103 in a flow path block 1, illustrated in FIG. 3, and then covering the indented portion 103 with the cover plate 35 illustrated in FIG. 1. Because of this, the flow meter as set forth in the first form of embodiment can be manufactured easily, enabling a highly accurate flow volume measurement capability to be obtained at a low cost.

Figure 9:
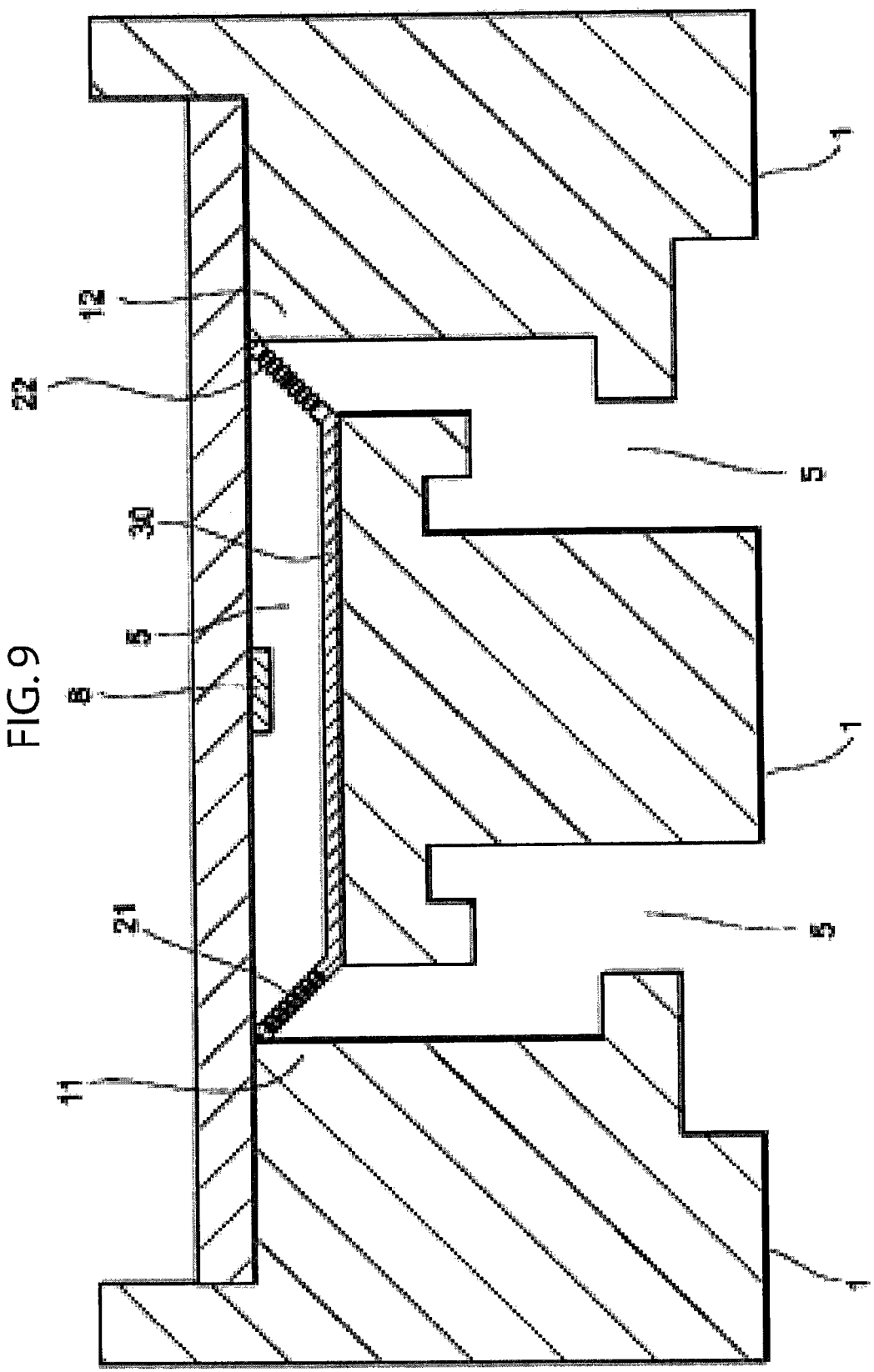
FIG. 9 is a cross-sectional diagram of a flow meter according to another embodiment according to the present invention.

A flow meter according to another embodiment, as illustrated in FIG. 9, is further provided with a second porous plate 22, at a second bend portion 12, at an angle relative to the direction in which the flow path 5 extends before and after the second bend portion 12. The second porous plate 22 is connected to the supporting plate 30 at an angle. The first porous plate 21, the supporting plate 30, and the second porous plate 22 may be integrated into a single unit.

Figure 10:
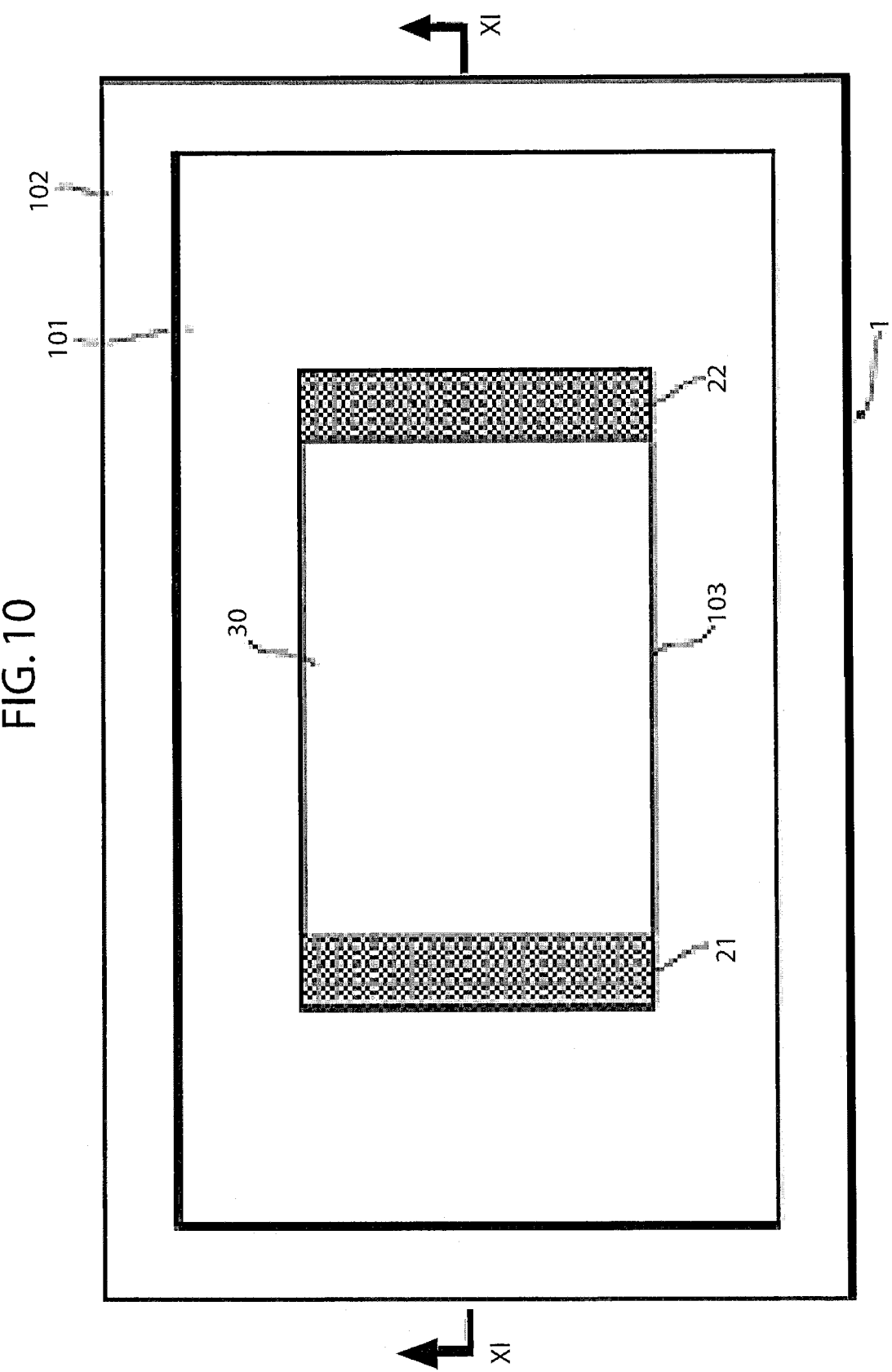
FIG. 10 is a top view diagram of a flow path block wherein a porous plate and a supporting plate are disposed according to an embodiment according to the present invention.
Figure 11:
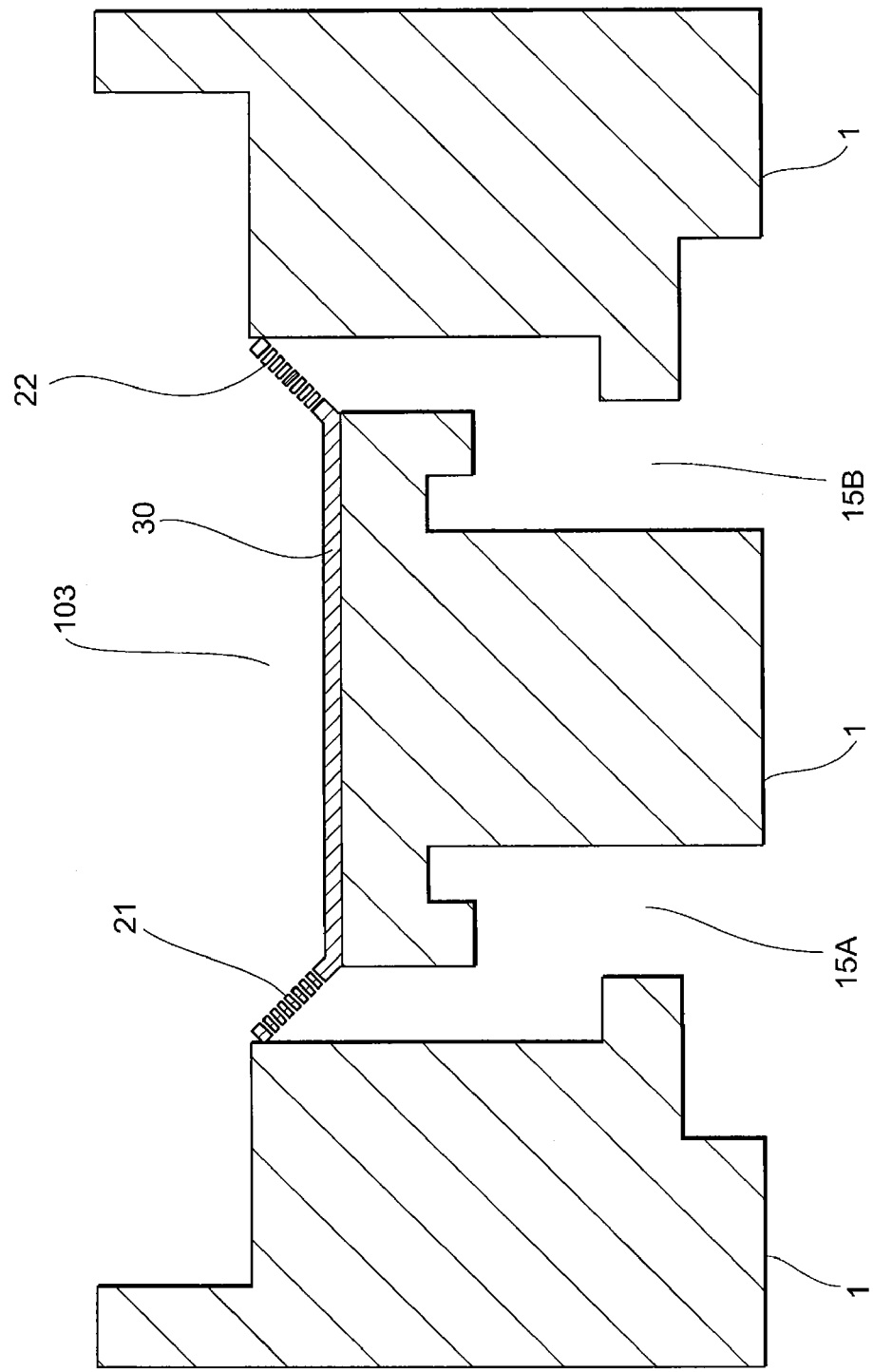
FIG. 11 is a cross-sectional diagram when viewed from the direction of XI-XI in FIG. 10 of the flow path block wherein the porous plate and the supporting plate are disposed according to an embodiment according to the present invention.

As is illustrated in FIG. 10 and in the cross-sectional diagram when viewed from the direction XI-XI in FIG. 11, the second porous plate 22, which is, for example, rectangular, is connected on one edge to the supporting plate 30, and is in contact with the indented portion 103 on the other three edges. Because of this, the second porous plate 22 is secured so as to cover the opening of the through hole 15B, provided in the bottom surface of the indented portion 103, at an angle through the force of friction that acts between the inner walls of the indented portion 103 and the side walls of the second porous plate 22.

A large number of holes are provided in the second porous plate 22, in the same manner as in the first porous plate 21. The constituent elements of the flow meter according to this embodiment are the same as in the previous embodiment, so explanations thereof will be omitted. The flow meter as set forth in the second form of embodiment is provided with a second porous plate 22 at the second bend portion 12 of the flow path 5 as well, and thus even when there is a back flow of the measurement fluid in the flow path 5, flow rectification is performed on the measurement fluid, enabling the speed of flow to be measured accurately.

Figure 12:
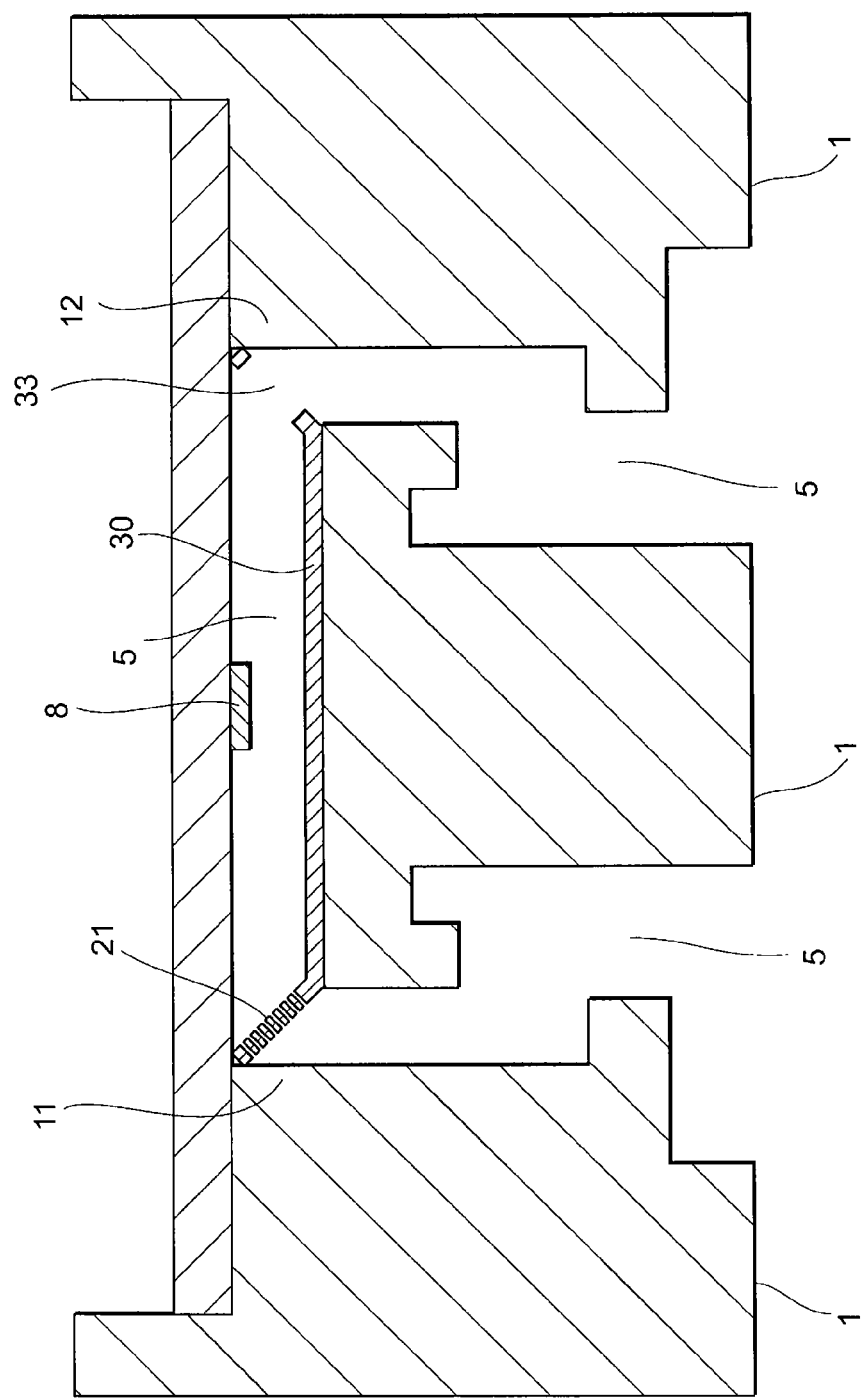
FIG. 12 is a cross-sectional diagram of a flow meter according to a further embodiment according to the present invention.

The flow meter according to further embodiment, as illustrated in FIG. 12, is provided with an open plate 33 that is disposed at the second bend portion 12 at an angle relative to the direction in which the flow path 5 extends to the front and back of the second bend portion 12. The open plate 33 is connected at an angle to the supporting plate 30. The first porous plate 21, the supporting plate 30, and the open plate 33 may be integrated into a single unit.

Figure 13:
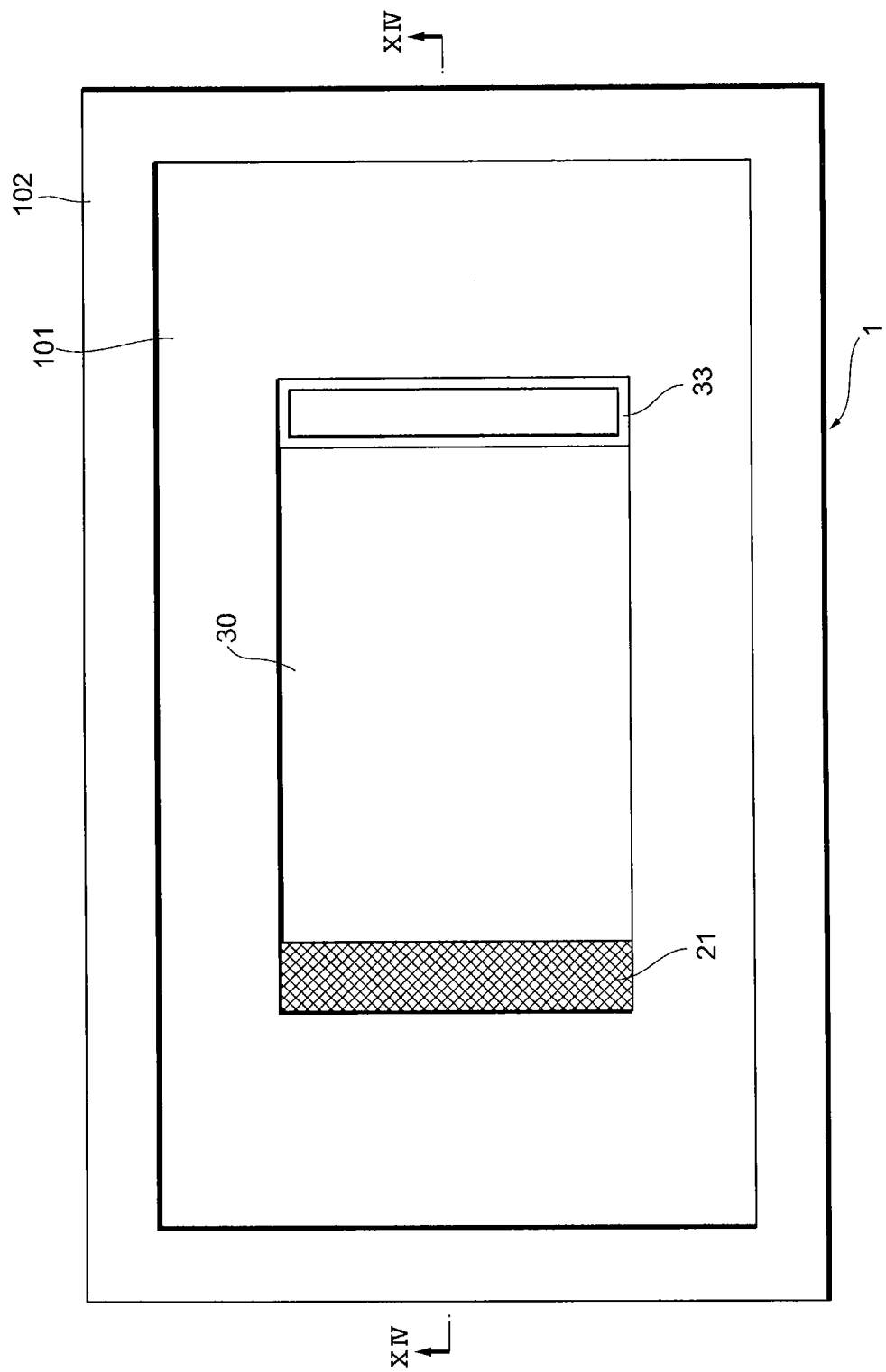
FIG. 13 is a top view diagram of a flow path block wherein a porous plate and a supporting plate are disposed according to an embodiment according to the present invention.
Figure 14:
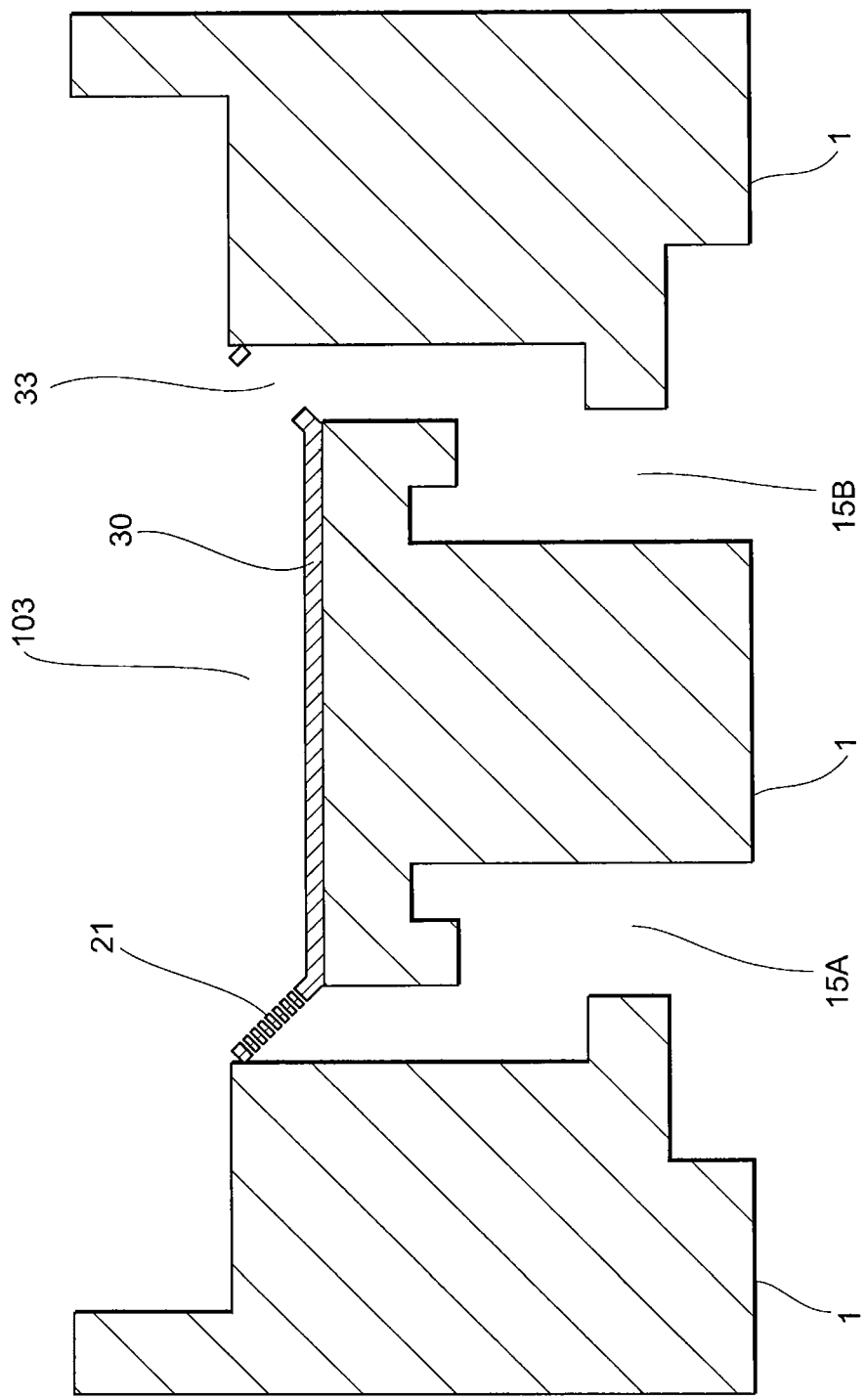
FIG. 14 is a cross-sectional diagram when viewed from the direction of XIV-XIV in FIG. 13 of the flow path block wherein the porous plate and the supporting plate are disposed according to an embodiment according to the present invention.

As illustrated in FIG. 13 and also in the cross-sectional diagram when viewed from the direction of XIV-XIV which is FIG. 14, one opening is provided, through etching, or the like, in the open plate 33. For example, a rectangular open plate 33 is connected on one edge to the supporting plate 30, and is in contact with the indented portion 103 on the other three edges. Because of this, the open plate 33 is secured so as to cover, at an angle, the opening of the through hole 15B, which is provided at the bottom surface of the indented portion 103, through the force of friction that acts between the inner walls of the indented portion 103 and the side surfaces of the open plate 33.

The constituent elements of the flow meter according to this embodiment are the same as those in the previous embodiments, so explanations thereof are omitted. If it is not necessary to measure the flow volume of measurement fluid flowing backward in the flow path 5, then there is no need for the provision of the second porous plate 22 in the second bend portion 12, as illustrated in FIG. 9, to rectify the flow of the measurement fluid in the backward direction. Furthermore, when it is not necessary to measure the flow volume of the measurement fluid in the backward direction in the flow path 5, then the provision of the second porous plate 22 in the second bend portion 12 would cause a loss of pressure in the forward flow. In contrast, in the flow meter according to this embodiment, illustrated in FIG. 12, an open plate 33 is disposed in the second bend portion 12, making it possible to reduce the forward-flow pressure loss. Because the outer periphery of the open plate 33 is in contact with the inner walls of the flow path 5, the supporting plate 30 and the first porous plate 21 that are connected to the open plate 33 are secured with greater stability within the flow path 5.

Figure 15:
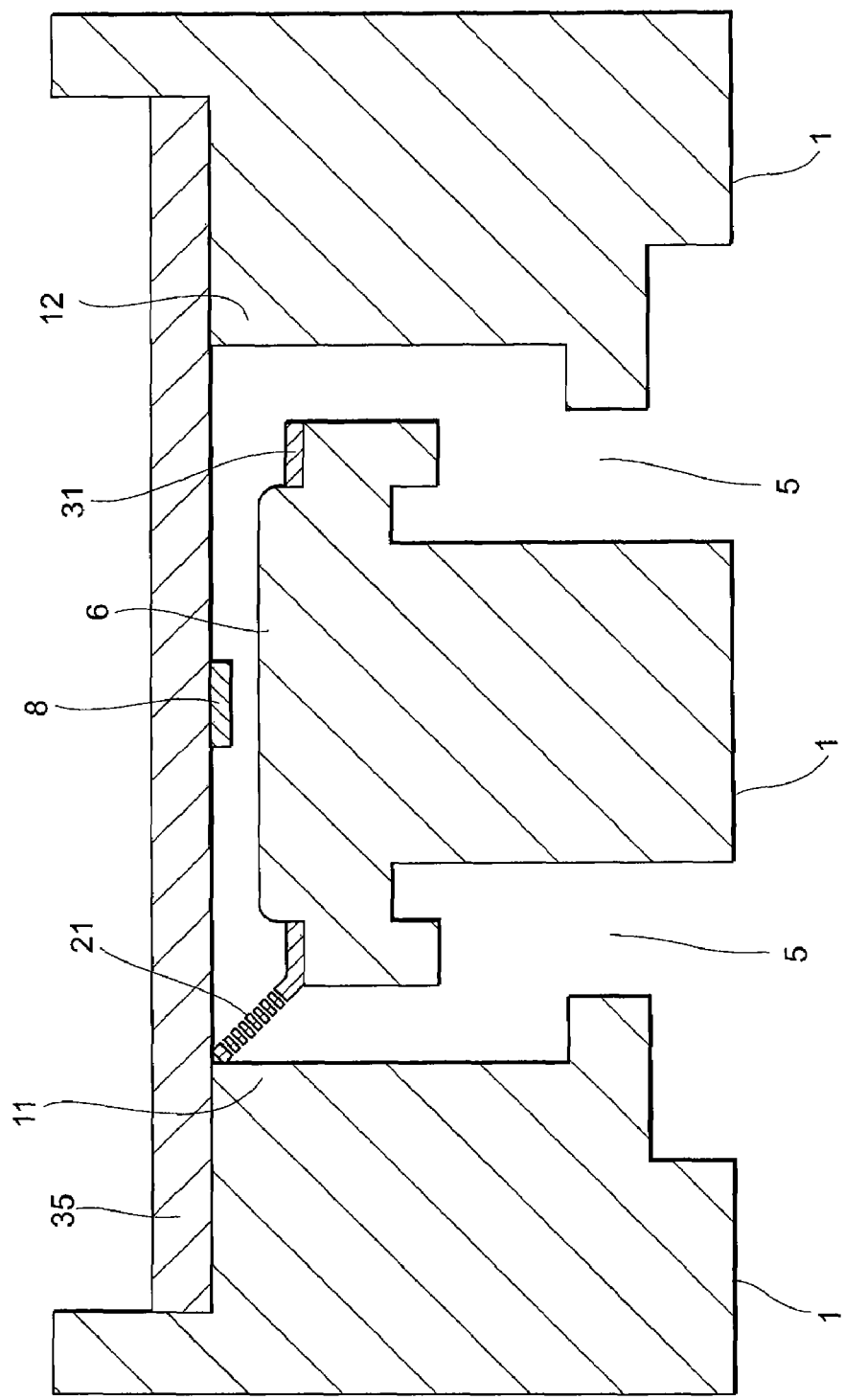
FIG. 15 is a cross-sectional diagram of a flow meter according to yet another embodiment according to the present invention.

In the flow meter as illustrated in FIG. 15, a protruding portion 6 is provided at the bottom surface of the flow path 5 between the first bend portion 11 and the second bend portion 12, and an opening portion provided in the supporting plate 31 and the protruding portion 6 fit together.

Figure 16:
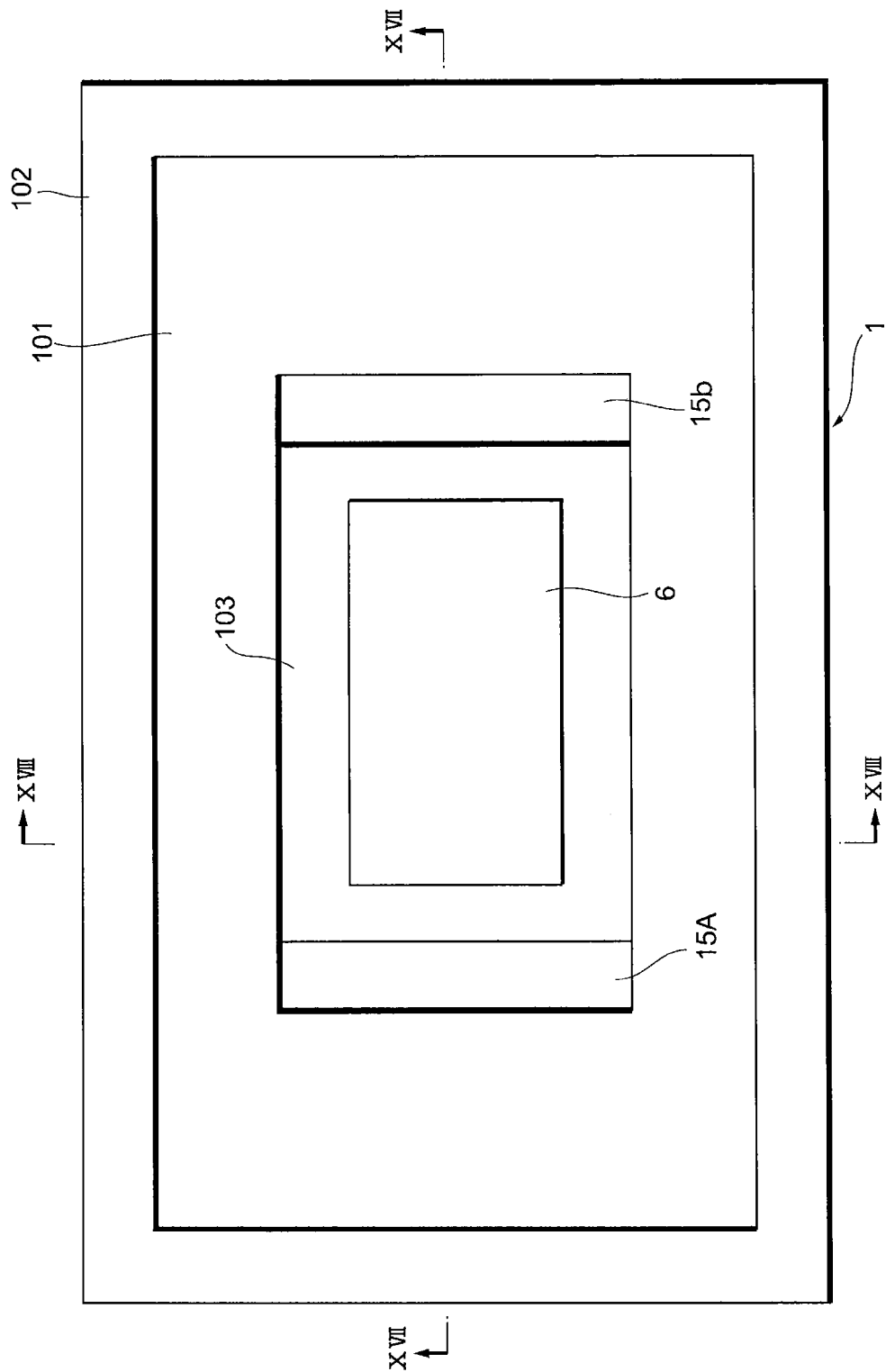
FIG. 16 is a top view diagram of a flow path block according to an embodiment according to the present invention.
Figure 17:
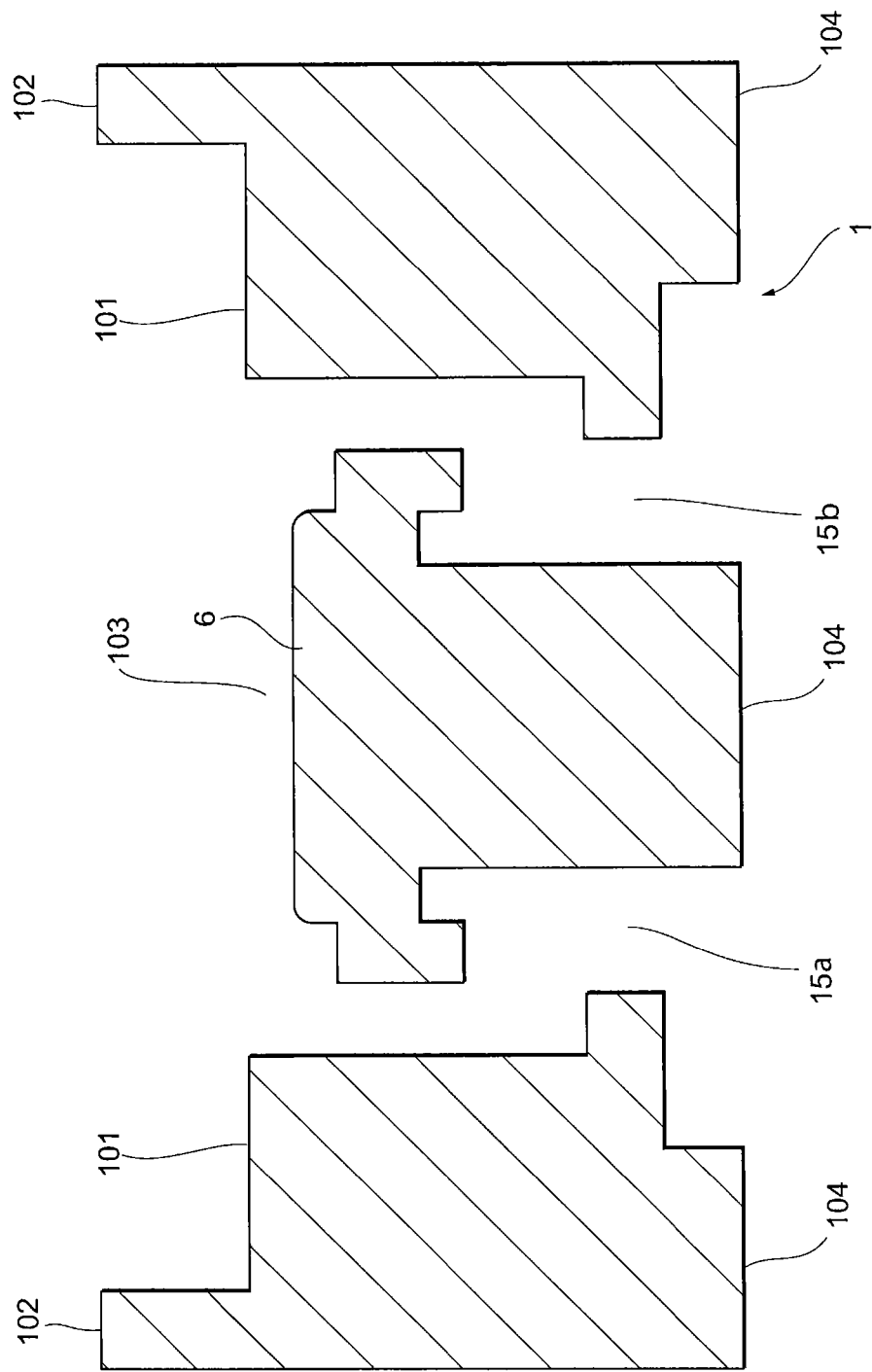
FIG. 17 is a cross-sectional diagram when viewed from the direction of XVII-XVII in FIG. 16 of the flow path block according to an embodiment according to the present invention.
Figure 18:
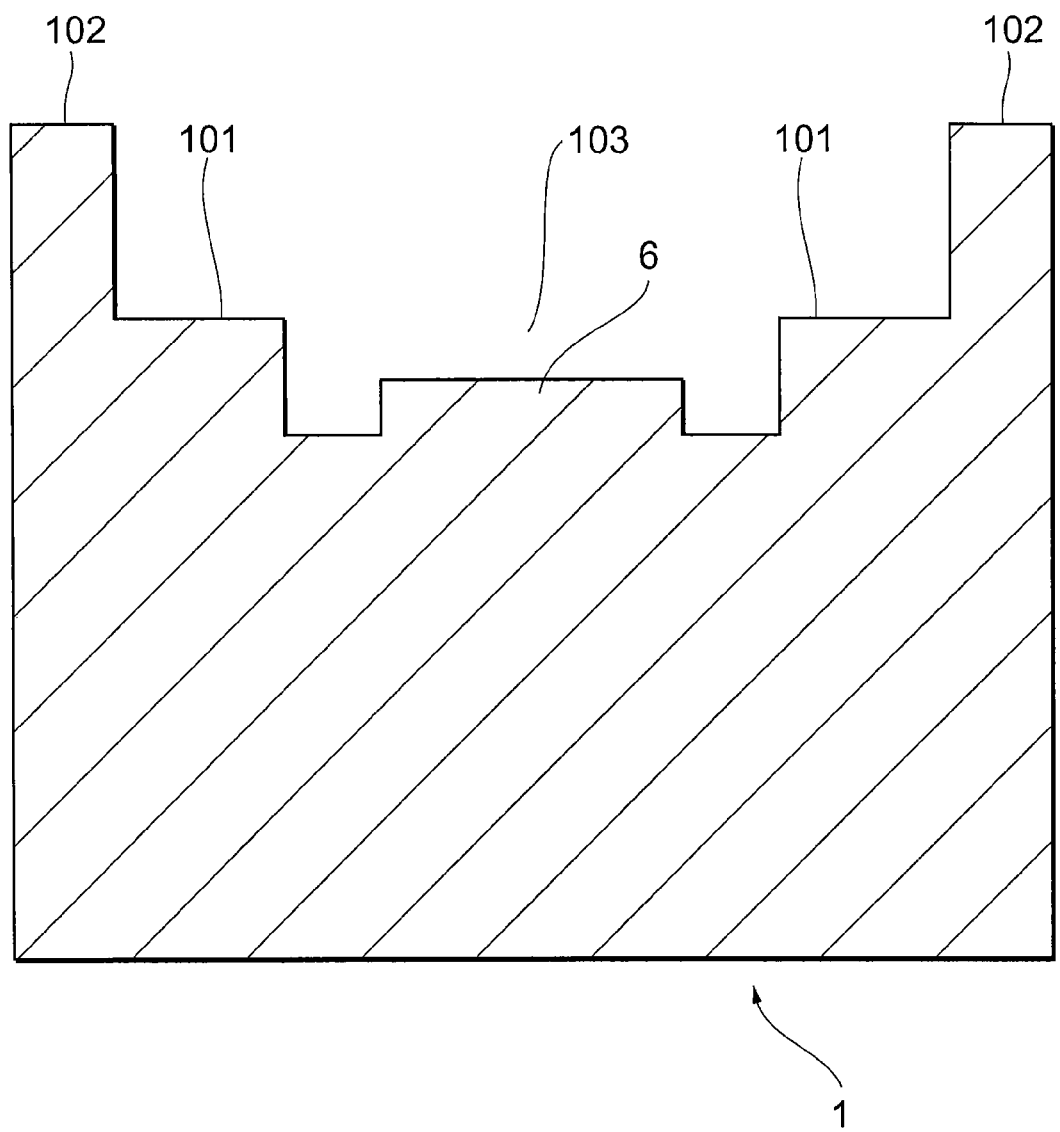
FIG. 18 is a cross-sectional diagram when viewed from the direction of XVIII-XVIII in FIG. 16 of the flow path block according to an embodiment according to the present invention.
Figure 19:
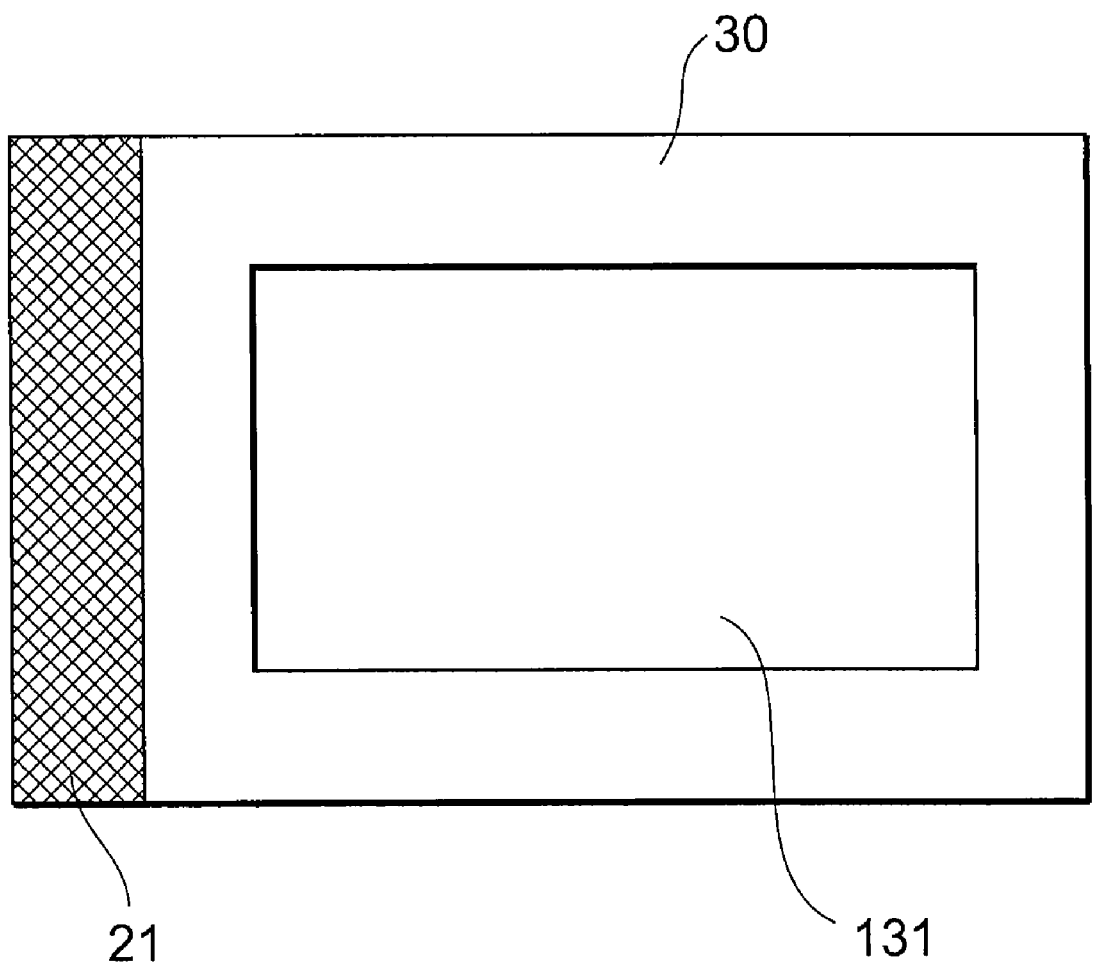
FIG. 19 is a top view diagram of a porous plate and a supporting plate according to an embodiment according to the present invention.

Specifically, as illustrated in FIG. 16, and also in the cross-sectional diagram viewed from the direction of XVII-XVII which is FIG. 17, and further in the cross-sectional diagram viewed from the direction of XVIII-XVIII which is FIG. 18, a protruding portion 6 is provided on the bottom surface of the indented portion 103 provided in the flow path block 1 of the flow meter according to this embodiment. Furthermore, as illustrated in FIG. 19, an opening 131 with essentially the identical shape as the top surface of the protruding portion 6 is provided in the supporting plate 31 that is connected to the first porous plate 21.

Figure 20:
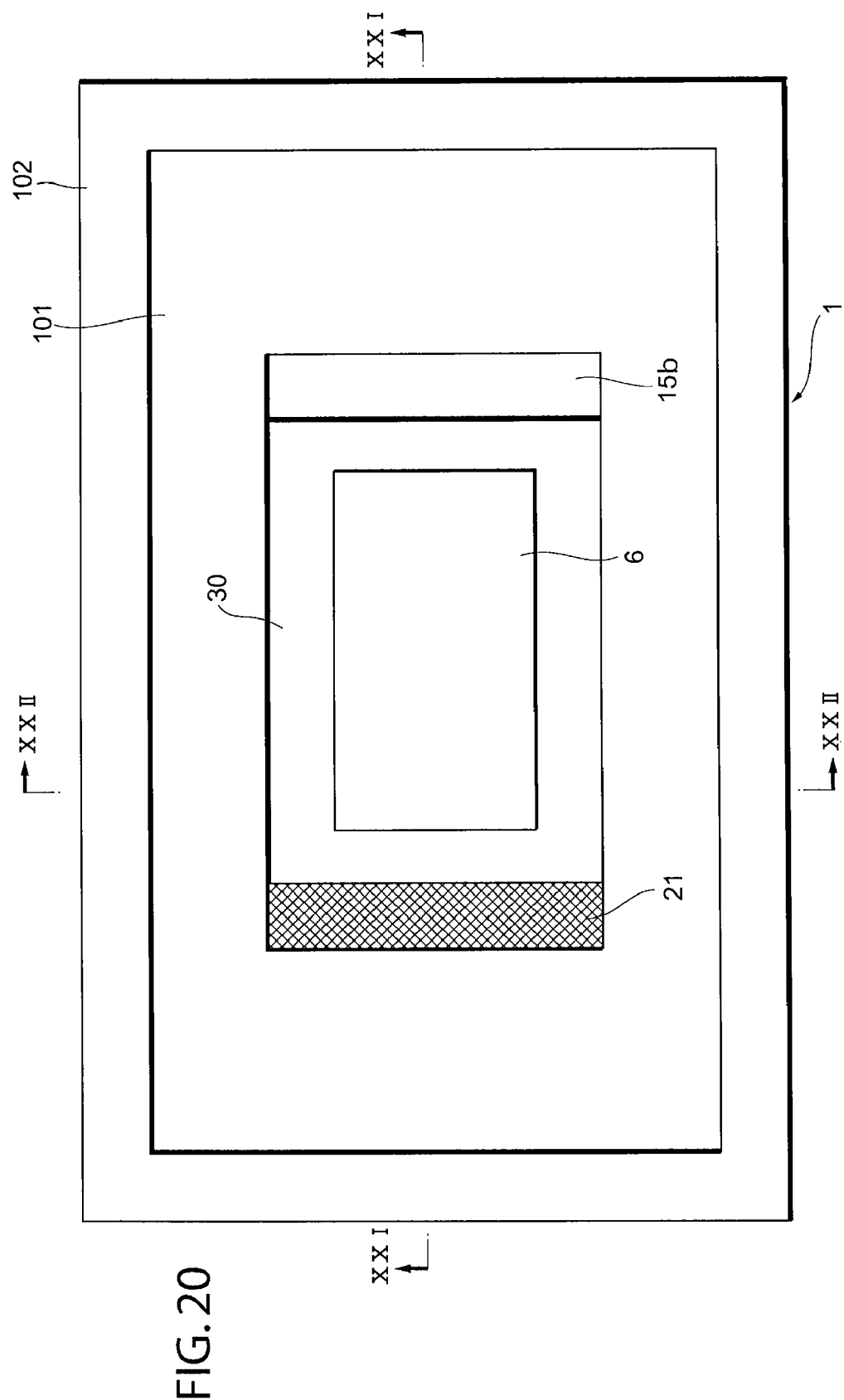
FIG. 20 is a top view diagram of a flow path block wherein the porous plate and the supporting plate are disposed according to an embodiment according to the present invention.
Figure 21:
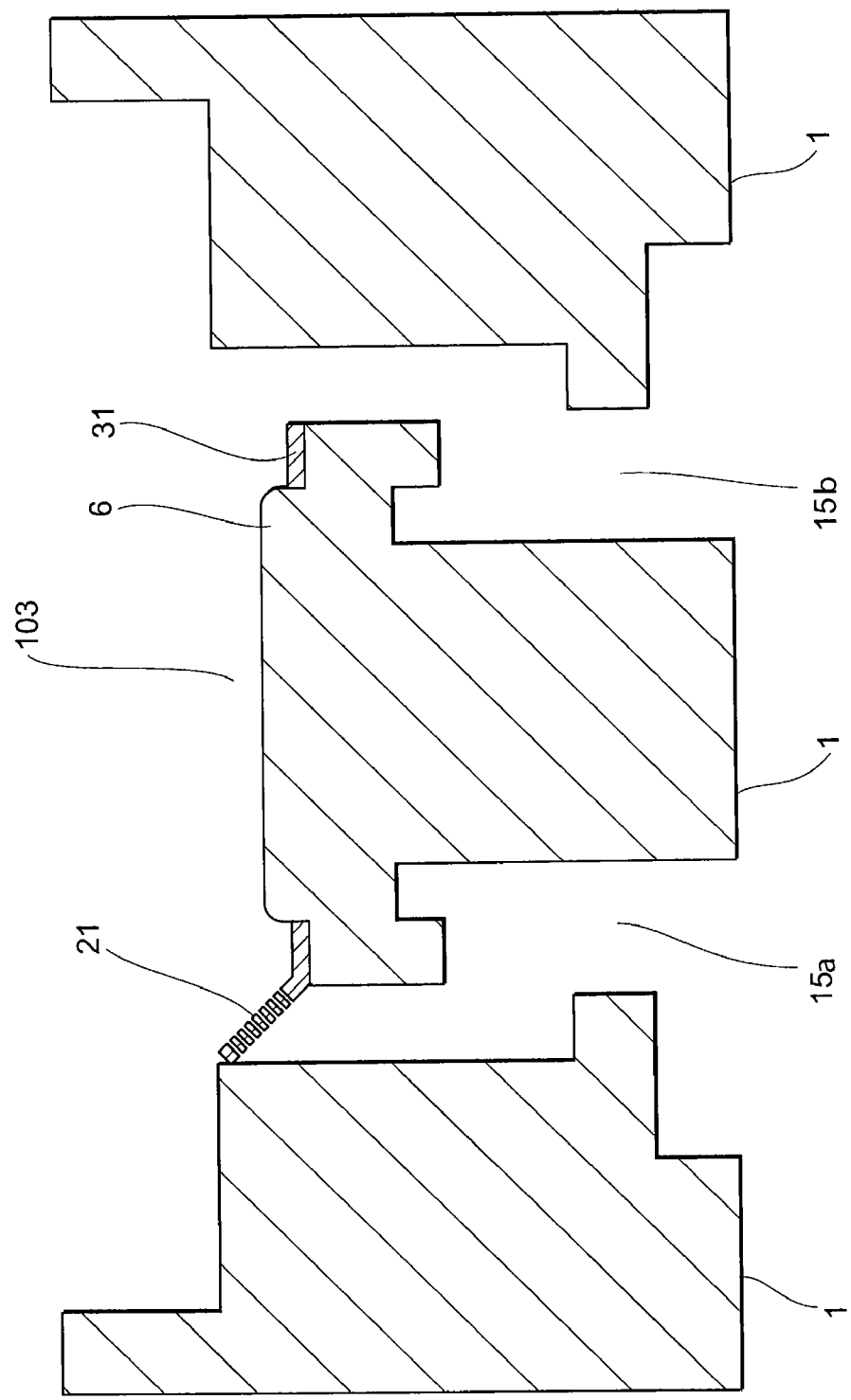
FIG. 21 is a cross-sectional diagram when viewed from the direction of XXI-XXI in FIG. 20 of the flow path block wherein the porous plate and the supporting plate are disposed according an embodiment according to the present invention.
Figure 22:
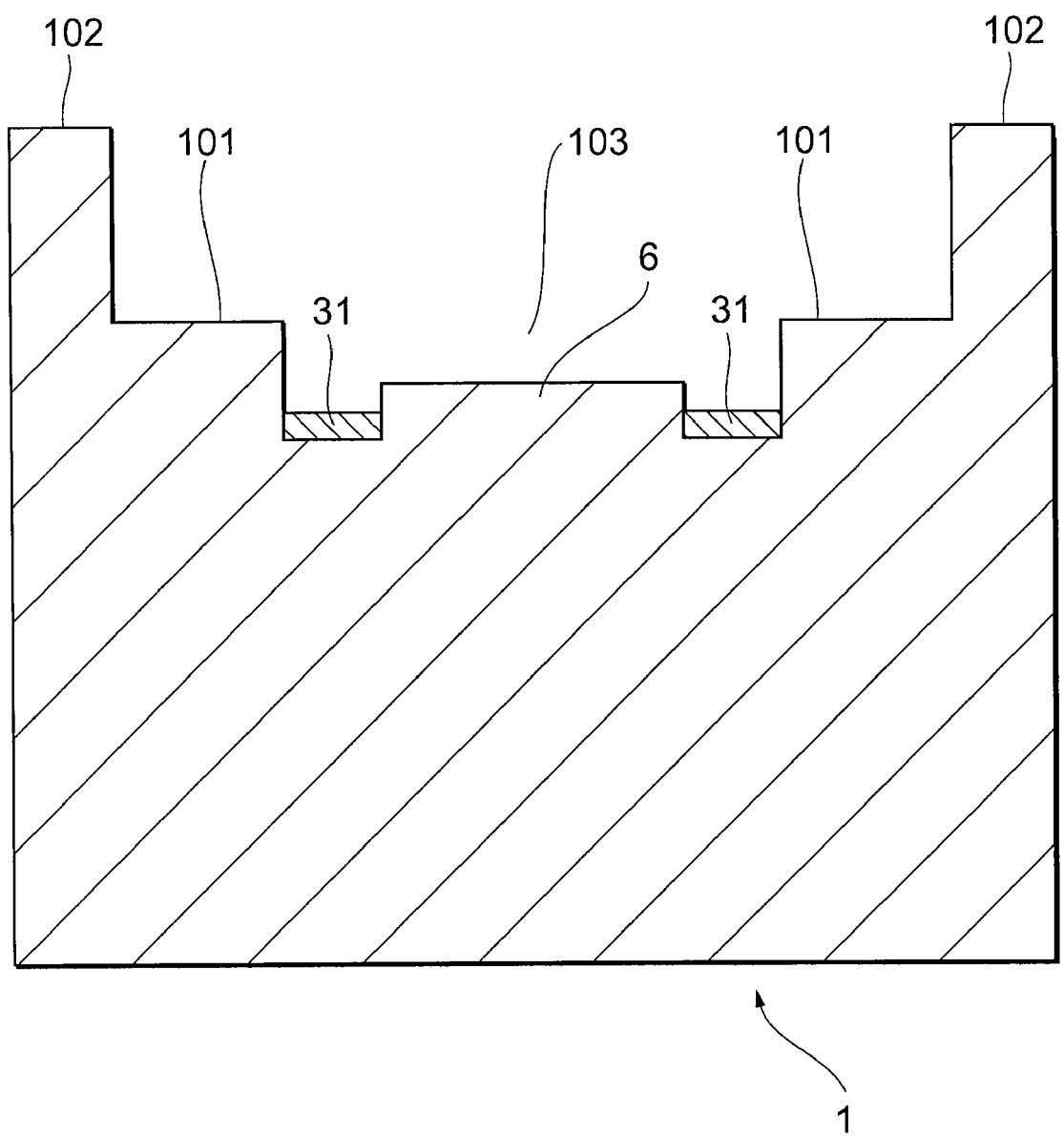
FIG. 22 is a cross-sectional diagram when viewed from the direction of XXII-XXII in FIG. 20 of the flow path block wherein the porous plate and the supporting plate are disposed according to an embodiment according to the present invention.

The supporting plate 31 that is connected to the first porous plate 21, as illustrated in FIG. 20, and also in the cross-sectional diagram when viewed from the direction of XXI-XXI which is FIG. 21, and further in the cross-sectional diagram when viewed from the direction of XXII-XXII which is FIG. 22, is disposed on the bottom surface of the indented portion 103 so that the protruding portion 6 fits into the opening 131 of the supporting plate 31. Moreover, the cover plate 35 is disposed as illustrated in FIG. 15 so as to cover the indented portion 103 so that the through hole 15A, the indented portion 103, and the through hole 15B, illustrated in FIG. 20 through FIG. 22, will function as a continuous flow path 5, illustrated in FIG. 15.

In the flow path set forth above, the opening 131 of the supporting plate 31 and the protruding portion 6 fit together. Because of this, even when an external force is applied to the supporting plate 31, a frictional force is produced between the inside wall of the opening 131 and the side walls of the protruding portion 6. As a result, the supporting plate 31 and the first porous plate 21 are secured within the flow path 5 with greater stability. Because the location of disposition of the supporting plate 31 is determined by the protruding portion 6, the assembly of the flow meter is simplified.

The depth of the indented portion 103 may be increased and the height of the protruding portion 6 may be increased to cause the depth of the flow path 5 directly under the flow sensor 8 to be shallow, and to cause the depth of both sides directly under the flow sensor 8 to be deep. The shallower the depth of the flow path 5, the more likely that the flow will be rectified through the viscosity of the measurement fluid, which is desirable for an accurate measurement. However, if the entirety of the flow path between the first bend portion 11 and the second bend portion 12 were to be narrowed, then only a small volume of the measurement fluid would flow in the flow path 5. In contrast, it is possible to cause a large volume of the measurement fluid to flow on both sides directly under the flow sensor 8 through having a deep depth, while still ensuring the flow rectifying effect in the neighborhood of the flow sensor 8, by causing the depth of the flow path 5 directly under the flow sensor 8 to be shallow through the provision of the protruding portion 6. Note that turbulence may be produced in the flow of the measurement fluid if the angle of the protruding portion 6 were a right angle, and thus it is possible to cause the measurement fluid to flow more smoothly through rounding the angle of the protruding portion 6.

Furthermore, the second porous plate 22, illustrated in FIG. 9, which was explained above, or the open plate 33 illustrated in FIG. 12, which was explained in another embodiment, may further be connected to the supporting plate 31.

Figure 23:
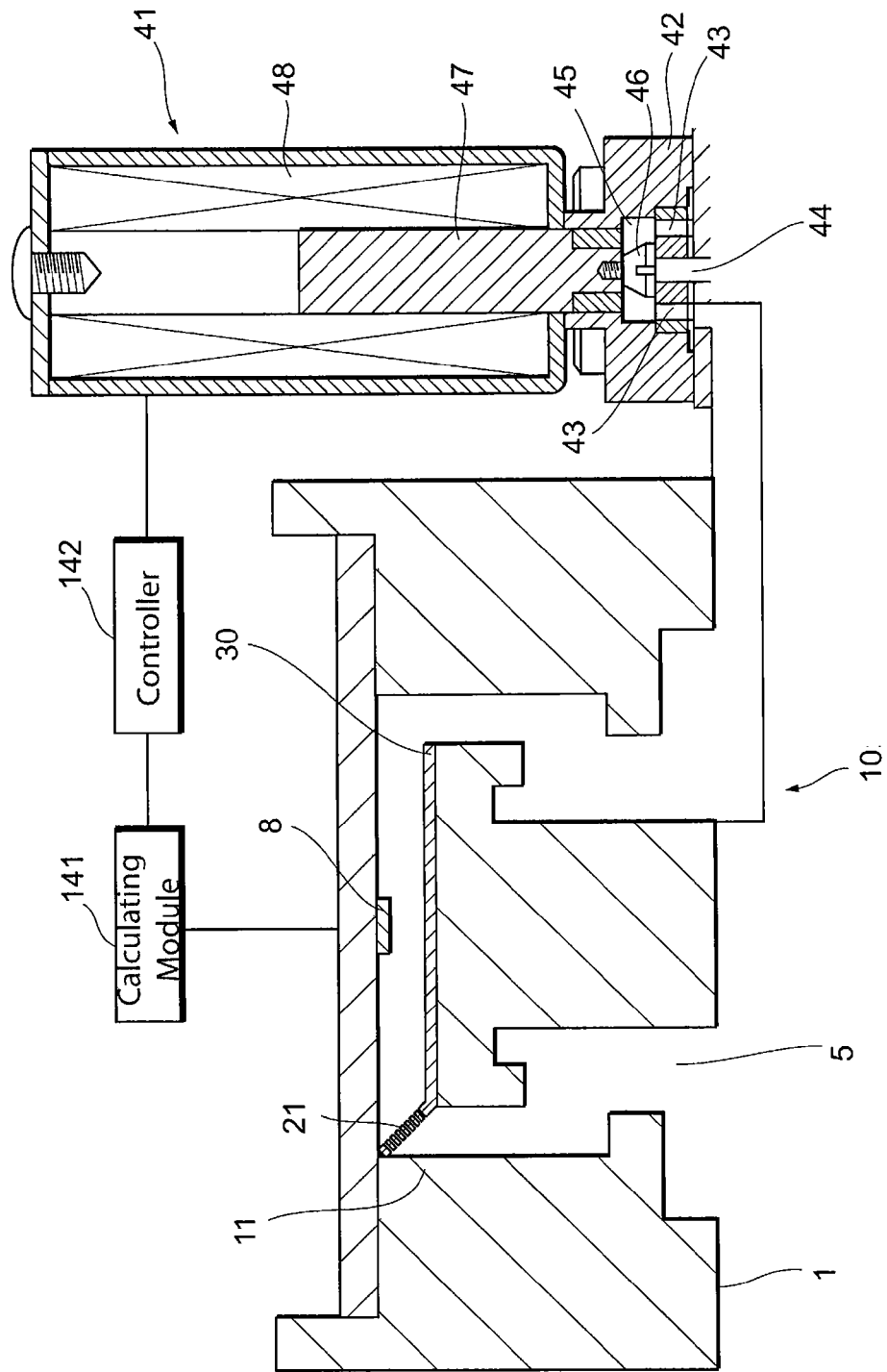
FIG. 23 is a schematic diagram of a flow volume controlling device according to an embodiment according to the present invention.

A flow volume controlling device may be provided with a flow meter 10, and a controlling valve 41 for controlling the flow volume that flows through the flow path 5, as illustrated in FIG. 23. The flow meter 10 is provided, in addition to the constituent elements described above, further with a calculating module 141 for calculating the flow volume of the measurement fluid that flows in the flow path 5 from the flow speed of the measurement fluid that flows in the flow path 5, detected by the flow sensor 8.

A controlling valve 41 for controlling the flow volume of the measurement fluid is, for example, a solenoid valve. The controlling valve 41 is provided with a flow path 43 and a flow path 44, a valve seat 42 that is provided with a valve chamber 45 that connects the flow path 43 and the flow path 44, a valve unit 46 that is housed in the valve chamber 45 and that opens and closes the flow path 44, a magnetic plunger 47 that is connected to the valve unit 46, and a solenoid coil 48 that is electrically conductive and that moves the plunger 47 up and down.

The flow volume controlling device according to this embodiment is further provided with a controller 142 for controlling the flow volume of the measurement fluid that flows in the flow path 5 through controlling the controlling valve 41 based on the flow volume that is calculated by the calculating module 141. The controller 142 is connected electrically to the solenoid coil 48 of the controlling valve 41 and to the calculating module 141. The controller 142 receives a flow volume signal from the calculating module 141, and if the flow volume is greater than a setting value, applies an electric current to the solenoid coil 48 to reduce the flow volume. If the flow volume is less than the set value, then an electric current is applied to the solenoid coil 48 to increase the flow volume.

The flow volume controlling device according to this embodiment uses the flow meter 10 described in the preceding embodiments, and thus is able to control the flow volume based on a flow volume that is detected with high accuracy. Note that, of course, the flow meters described in the other embodiments may also be used.

While the present invention was explained through embodiments as described above, the description and drawings that form a portion of this disclosure must not be understood as limiting the present invention. Various alternative forms of embodiment, examples of embodiment, and application technologies will be readily apparent from this disclosure to those skilled in the art.

Figure 24:
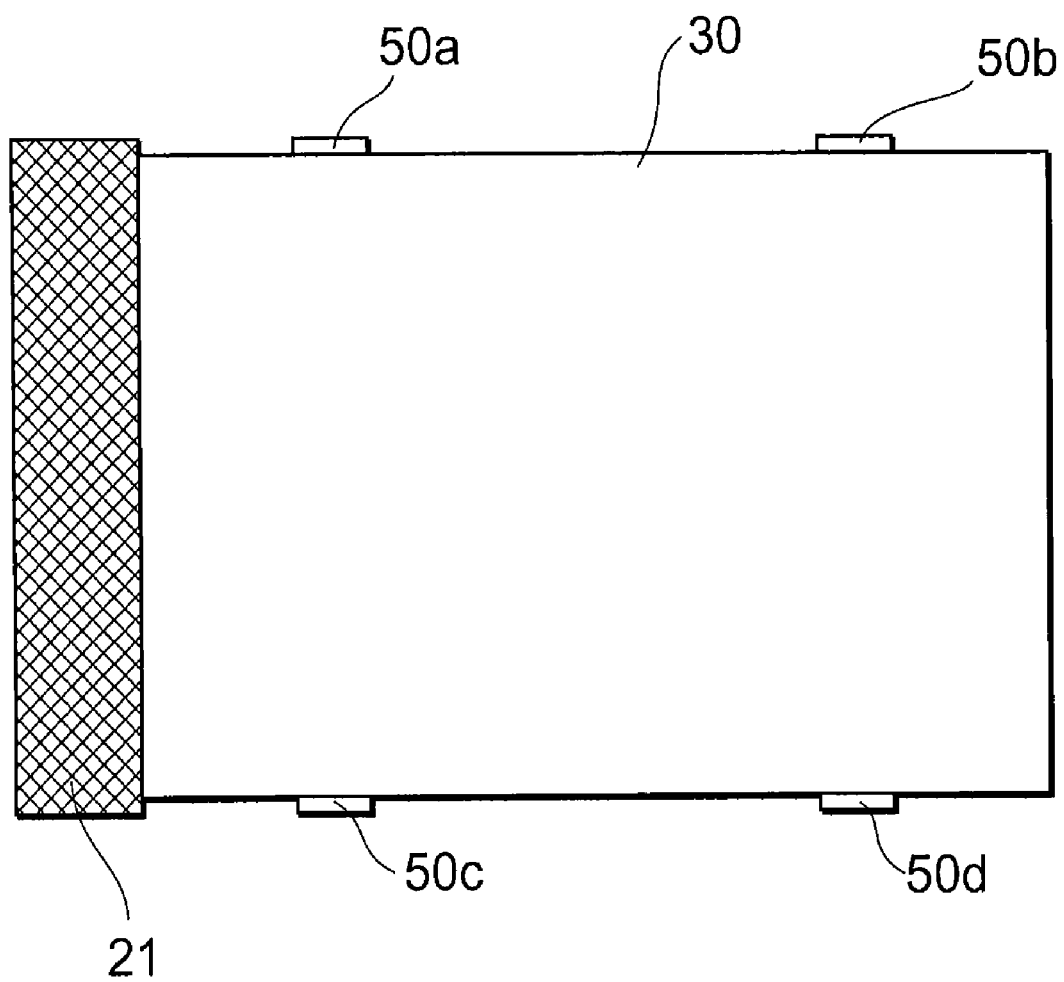
FIG. 24 is a first top view diagram of a porous plate and a supporting plate according to an embodiment according to the present invention.
Figure 25:
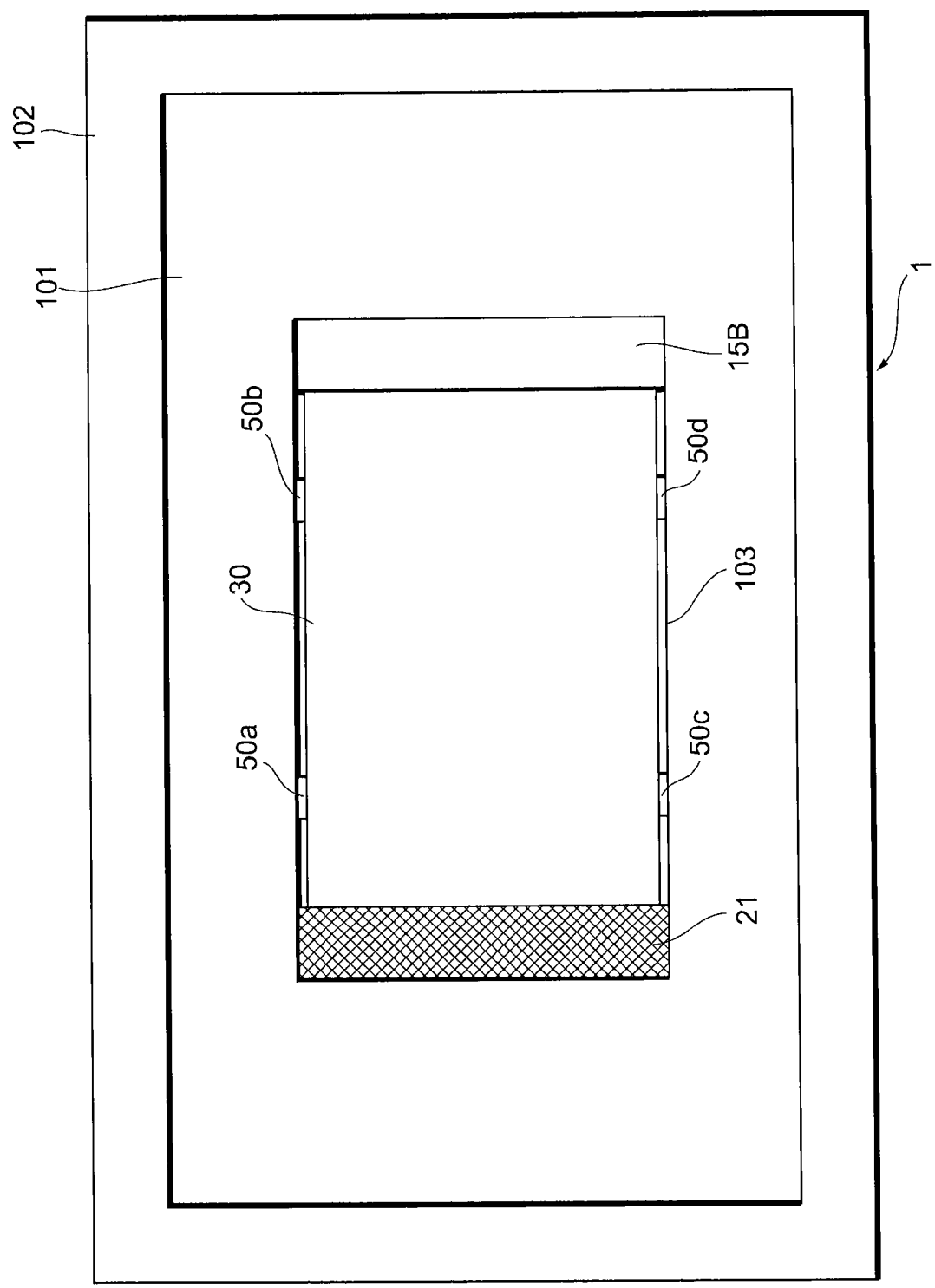
FIG. 25 is a first top view diagram of a flow path block wherein a porous plate and a supporting plate are disposed according to an embodiment according to the present invention.

For example, as illustrated in FIG. 24, contacting members 50a, 50b, 50c, and 50d, such as ribs, protrusions, or the like, may be provided on the side walls of the supporting plate 32. As illustrated in FIG. 25, the contacting of these contacting members 50a, 50b, 50c, and 50d to the inner wall of the indented portion 103 can secure the first porous plate 21 and the supporting plate 32 with stability within the indented portion 103 through the frictional force that operates between the inner walls of the indented portion 103 and the contacting members 50a, 50b, 50c, and 50d, even when an external force is applied to the first porous plate 21 and the supporting plate 32. Note that the contacting members 50a, 50b, 50c, and 50d may be integrated as a single unit with the supporting plate 32.

Figure 26:
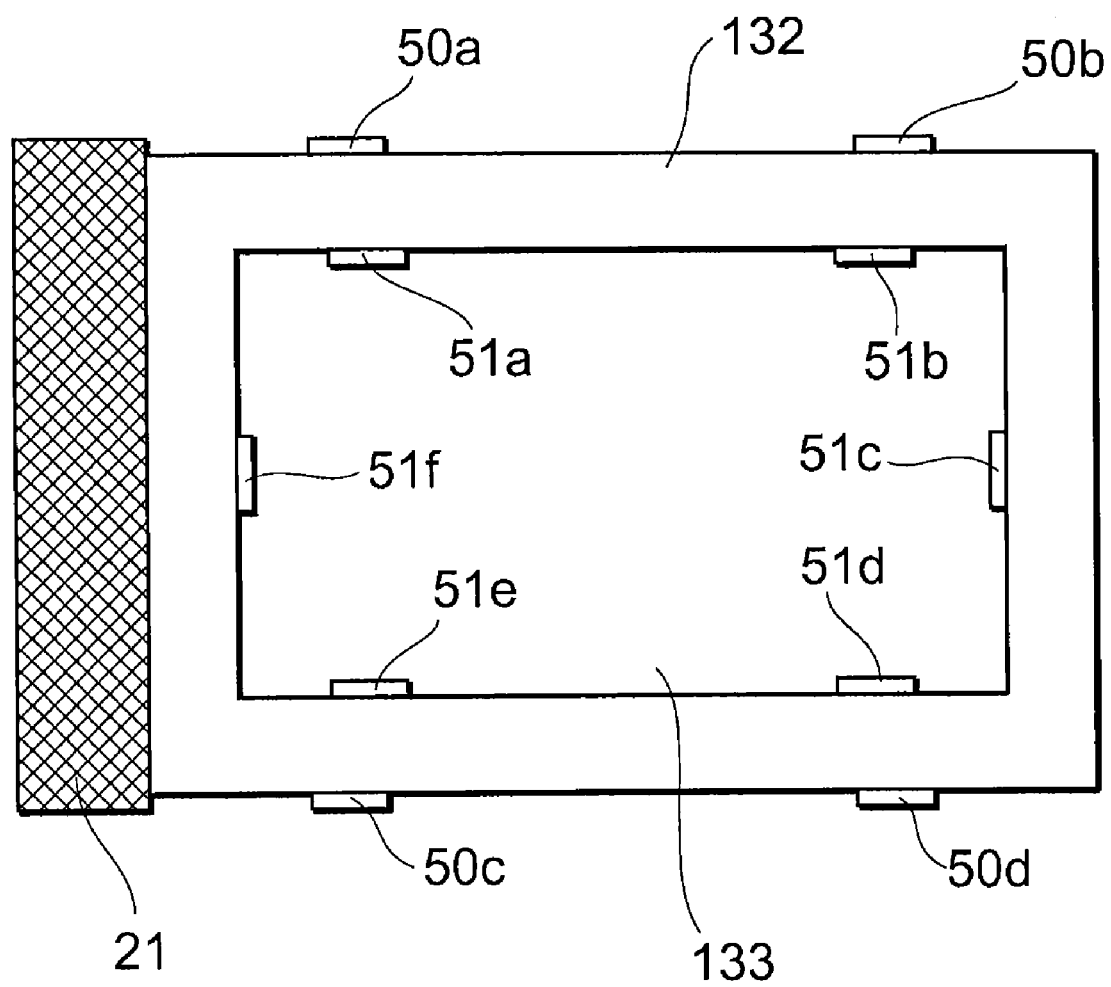
FIG. 26 is a second top view diagram of a porous plate and a supporting plate according to an embodiment according to the present invention.
Figure 27:
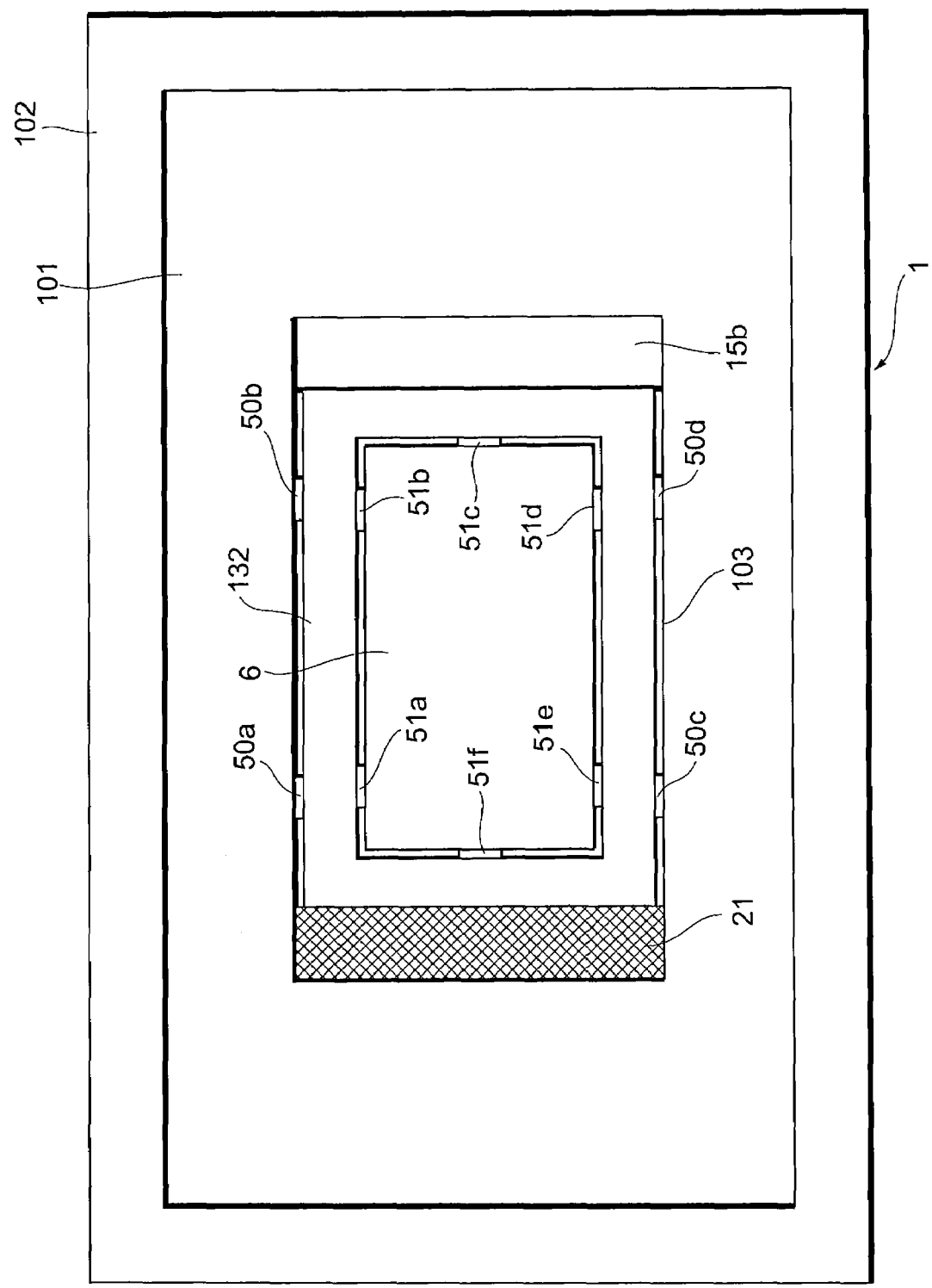
FIG. 27 is a second top view diagram of a flow path block wherein a porous plate and a supporting plate are disposed according to a further embodiment according to the present invention.

Additionally, as illustrated in FIG. 26, contacting members 51a, 51b, 51c, 51d, 51e, and 51f may further be provided on the inner walls of the opening 133 of the supporting plate 132. As illustrated in FIG. 27, the contacting of the contacting members 51a, 51b, 51c, 51d, 51e, and 51f to the side walls of the protruding portion 6 can secure the first porous plate 21 and the supporting plate 32 with greater stability on the inside of the indented portion 103. Note that the contacting members 51a, 51b, 51c, 51d, 51e, and 51f and the supporting plate 132 may be integrated into a single unit.

Furthermore, the porous plates may be disposed as multiple plates in the first bend portion 11 and the second bend portion 12 illustrated in FIG. 9. Furthermore, while the explanation was of a large number of holes being provided through etching in the first porous plate 21 and the second porous plate 22, instead the first porous plate 21 and the second porous plate 22 may be formed, in part or in whole, as a metal mesh.

Figure 28:
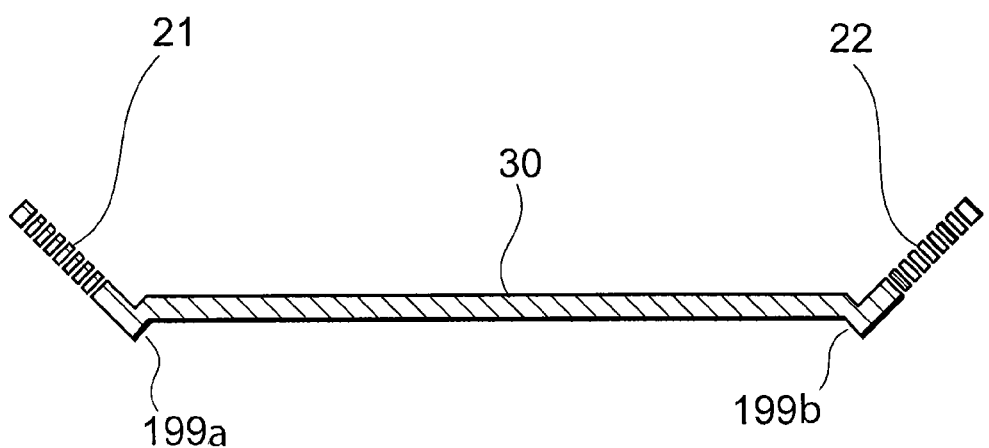
FIG. 28 is a side view diagram of a porous plate and a supporting plate according to an embodiment according to the present invention.
Figure 29:
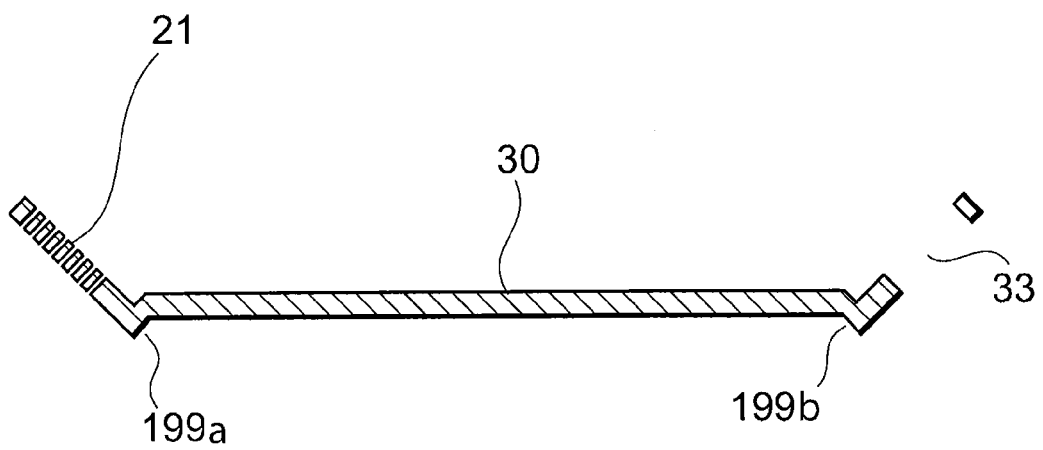
FIG. 29 is a side view diagram of a open plate and a supporting plate according to an embodiment according to the present invention.

Furthermore, as illustrated in FIG. 28, an end portion 199A of the supporting plate 30, and an end portion 199B opposite of the end portion 199A, may both be bent into wedge shapes, where the first porous plate 21 may be connected to the bent end portion 199A, and the second porous plate 22 may be connected to the bent end portion 199B. An effect may be produced wherein the supporting plate 30 is less likely to become bowed within the flow path 5 illustrated in FIG. 1, through bending the end portions of the supporting plate 30. Furthermore, as illustrated in FIG. 29, the first porous plate 21 may be connected to the bent end portion 199A, and the open plate 33 may be connected to the bent end portion 199B.

In this way, it should be understood that the present invention incorporates a variety of forms of embodiment, and the like, not described herein. Consequently, the present invention is limited only by the items defining the invention in the scope of patent claims that are appropriate from this disclosure.

The invention claimed is:

1. A flow meter comprising an inflow opening into which a measurement fluid flows, an outflow opening from which the measurement fluid flows, and a flow path connecting the inflow opening and the outflow open, wherein the flow path is bent at a first bend portion, comprising:
    a first porous plate, disposed in the first bend portion of the flow path, at an angle relative to the direction in which the flow path extends before and after the first bend portion; and
    a flow sensor for detecting the flow speed or flow volume of the measured fluid, disposed on an inner wall of the flow path towards the outflow opening side from the first bend portion.

2. The flow meter as set forth in claim 1, wherein:
    the flow path is further bent at a second bend portion;
        a second flow path is provided linearly between the first and second bend portions; and
    the flow sensor is disposed on the inner wall of the second flow path between the first and second bend portions.

3. The flow meter as set forth in claim 2, further comprising:
    a second porous plate disposed at the second bend portion of the flow path at an angle relative to the direction in which the second flow path extends before and after the second bend portion.

4. The flow meter as set forth in claim 2, further comprising:
an open plate disposed at the second bend portion of the flow path, at an angle relative to the direction in which the flow path extends before and after the second bend portion.

5. The flow meter as set forth in claim 1, further comprising:
a supporting plate connected to the first supporting plate at an angle.

6. The flow meter as set forth in claim 3, further comprising:
a supporting plate connected at an angle to the first porous plate and to the second porous plate.

7. The flow meter as set forth in claim 6, wherein each of opposite end portions of the supporting plate are bent into wedge shapes, and the bent end portions are connected respectively to the first porous plate and to the second porous plate.

8. The flow meter as set forth in claim 4, further comprising:
a supporting plate that is connected at an angle to the first porous plate and to the open plate.

9. The flow meter as set forth in claim 8, wherein each of opposite end portions of the supporting plate are bent into wedge shapes, and the bent end portions are connected respectively to the first porous plate and to the open plate.

10. The flow meter as set forth in claim 5, wherein:
the inner wall of the flow path is planar, and the supporting plate is disposed on the inner wall of the flow path.

11. The flow meter as set forth in claim 5, wherein:
an opening is provided in the supporting plate and a protruding portion is provided on the inner wall of the flow path; and wherein the opening of the supporting plate fits with the protruding portion.

12. The flow meter as set forth in claim 1, wherein:
a side surface of the first porous plate is in contact with the inner wall of the flow path.

13. The flow meter as set forth in claim 5, wherein:
at least a portion of a side surface of the supporting plate is in contact with the inner wall of the flow path.

14. The flow meter as set forth in claim 5, wherein:
a contacting member contacting the inner wall of the flow path is provided on a side surface of the supporting plate.

15. The flow meter as set forth in claim 11, wherein:
a contacting member contacting the protruding portion is provided at an inner wall of the opening of the supporting plate.

16. A flow volume controlling device comprising an inflow opening into which a measurement fluid flows, an outflow opening from which a measurement fluid flows, and a flow path connecting the inflow opening end to the outflow opening, and wherein the flow path is bent at a first bend portion, comprising:
a first porous plate disposed in the first bend portion of the flow path at an angle relative to a direction in which the flow path extends before and after the first bend portion;
a flow sensor disposed on the inner wall of the flow path on a side towards the outflow opening from the first bend portion;
a calculating module calculating the flow volume of a measurement fluid that flows in the flow path from a flow speed of the measurement fluid that flows in the flow path, detected by the flow sensor;
a controlling valve provided in the flow path; and
a controller controlling the flow volume by controlling the valve based on the flow volume calculated.

* * * * *